United States Patent [19]
Kotani et al.

[11] Patent Number: 5,766,751
[45] Date of Patent: Jun. 16, 1998

[54] LAMINATE, LAMINATE FILM AND SHAPED ARTICLE COMPRISING INORGANIC LAMINAR COMPOUND

[75] Inventors: Kozo Kotani, Toyonaka; Toshio Kawakita, Funabashi; Taiichi Sakaya; Toshiya Kuroda, both of Takatsuki, all of Japan

[73] Assignee: Sumitomo Chemical Company, Ltd., Osaka, Japan

[21] Appl. No.: 522,425

[22] PCT Filed: Jan. 24, 1995

[86] PCT No.: PCT/JP95/00073

§ 371 Date: Sep. 22, 1995

§ 102(e) Date: Sep. 22, 1995

[87] PCT Pub. No.: WO95/19887

PCT Pub. Date: Jul. 27, 1995

[30] Foreign Application Priority Data

| Jan. 24, 1994 | [JP] | Japan | 6-006013 |
| Jan. 26, 1994 | [JP] | Japan | 6-007026 |
| Jan. 26, 1994 | [JP] | Japan | 6-007027 |
| Jan. 26, 1994 | [JP] | Japan | 6-007029 |

[51] Int. Cl.$^6$ ............................................. B32B 5/16
[52] U.S. Cl. .......................... 428/323; 428/325; 428/328; 428/331; 428/410; 428/913
[58] Field of Search ............................ 428/323, 331, 428/325, 480, 910, 913, 328

[56] References Cited

U.S. PATENT DOCUMENTS

| 3,499,820 | 3/1970 | Desaulniers | 428/323 |
| 3,668,038 | 6/1972 | Kirk et al. | 156/276 |
| 3,914,518 | 10/1975 | Haskell | 428/451 |
| 4,102,974 | 7/1978 | Boni | 264/294 |
| 4,376,183 | 3/1983 | Haskell | 524/417 |
| 4,818,782 | 4/1989 | Bissot | 524/413 |
| 4,983,432 | 1/1991 | Bissot | 428/35.7 |
| 5,164,258 | 11/1992 | Shida et al. | 428/319.3 |
| 5,221,566 | 6/1993 | Tokoh et al. | 428/34.5 |
| 5,244,729 | 9/1993 | Harrison et al. | 428/331 |
| 5,246,753 | 9/1993 | Koyama et al. | 428/36.7 |
| 5,378,428 | 1/1995 | Inoue et al. | 422/9 |

FOREIGN PATENT DOCUMENTS

| 62-148532 | 7/1987 | Japan . |
| 1-313536 | 12/1989 | Japan . |
| 2-158339 | 6/1990 | Japan . |
| 3-30944 | 2/1991 | Japan . |
| 3-93542 | 4/1991 | Japan . |

*Primary Examiner*—H. Thi Le
*Attorney, Agent, or Firm*—Cushman Darby & Cushman IP Group of Pillsbury Madison & Sutro, LLP

[57] ABSTRACT

A laminate, laminate film or shaped article, which includes: a layer of a substance having a gas barrier property; and at least one layer or portion (1) disposed thereon comprising a resin composition comprising a resin and an inorganic laminar compound having an aspect ratio of not less than 50 and not more than 5000. As the gas barrier substance, a metal or oxide, ethylene-vinyl alcohol copolymer, or polyvinylidene chloride may preferably be used.

Such a laminate, laminate film or shaped article may exhibit a good gas barrier property which is much higher than that of a conventional plastic material.

27 Claims, 10 Drawing Sheets

"k" (IN TERMS OF LENGTH) IS NOT SMALLER THAN WIDTH OF ONE RESIN CHAIN $\theta_d \rightarrow$ ANGLE OF DIFFRACTION CORRESPONDING TO "UNIT THICKNESS $\underline{a}$+WIDTH OF ONE RESIN CHAIN"

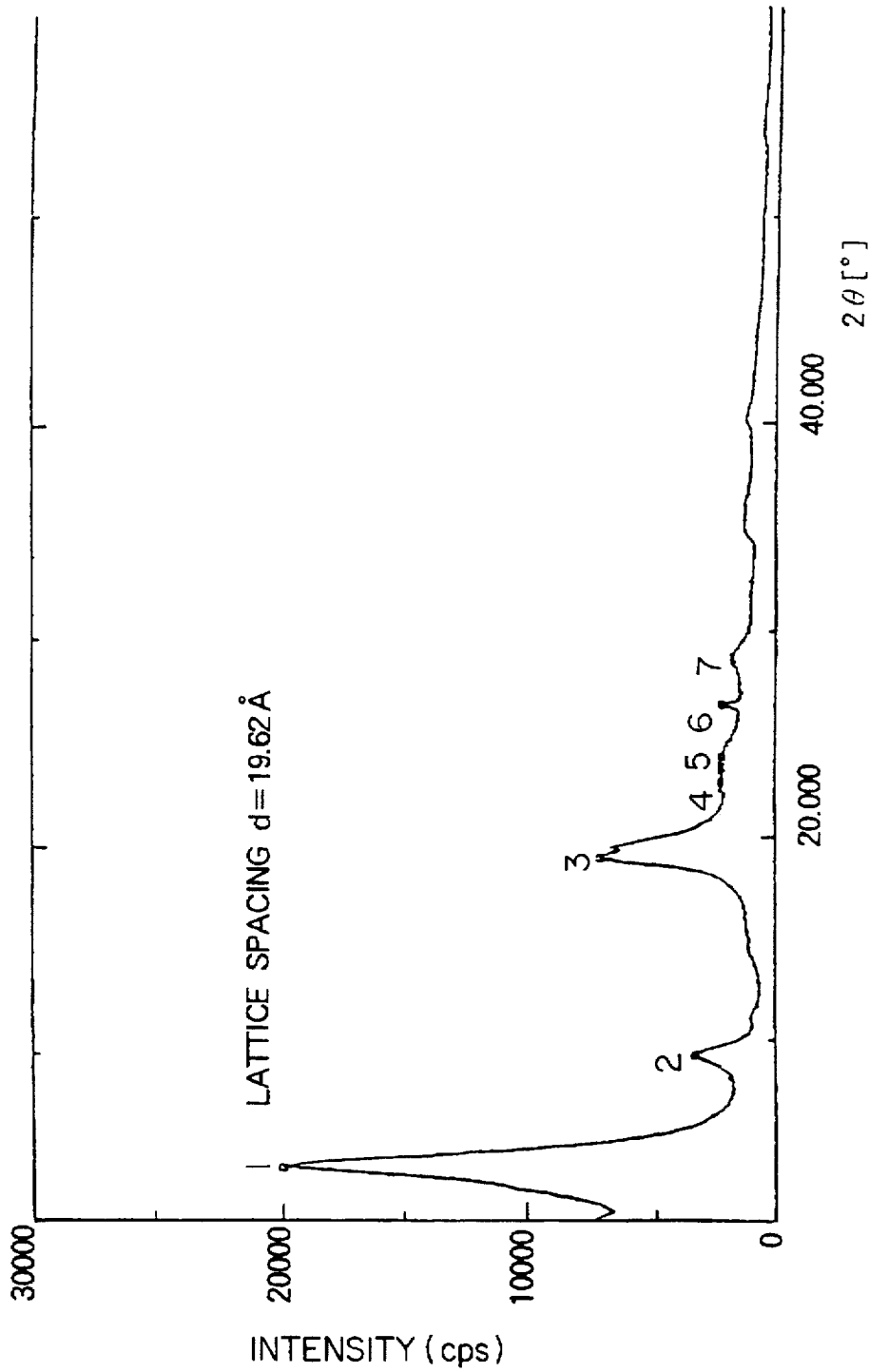

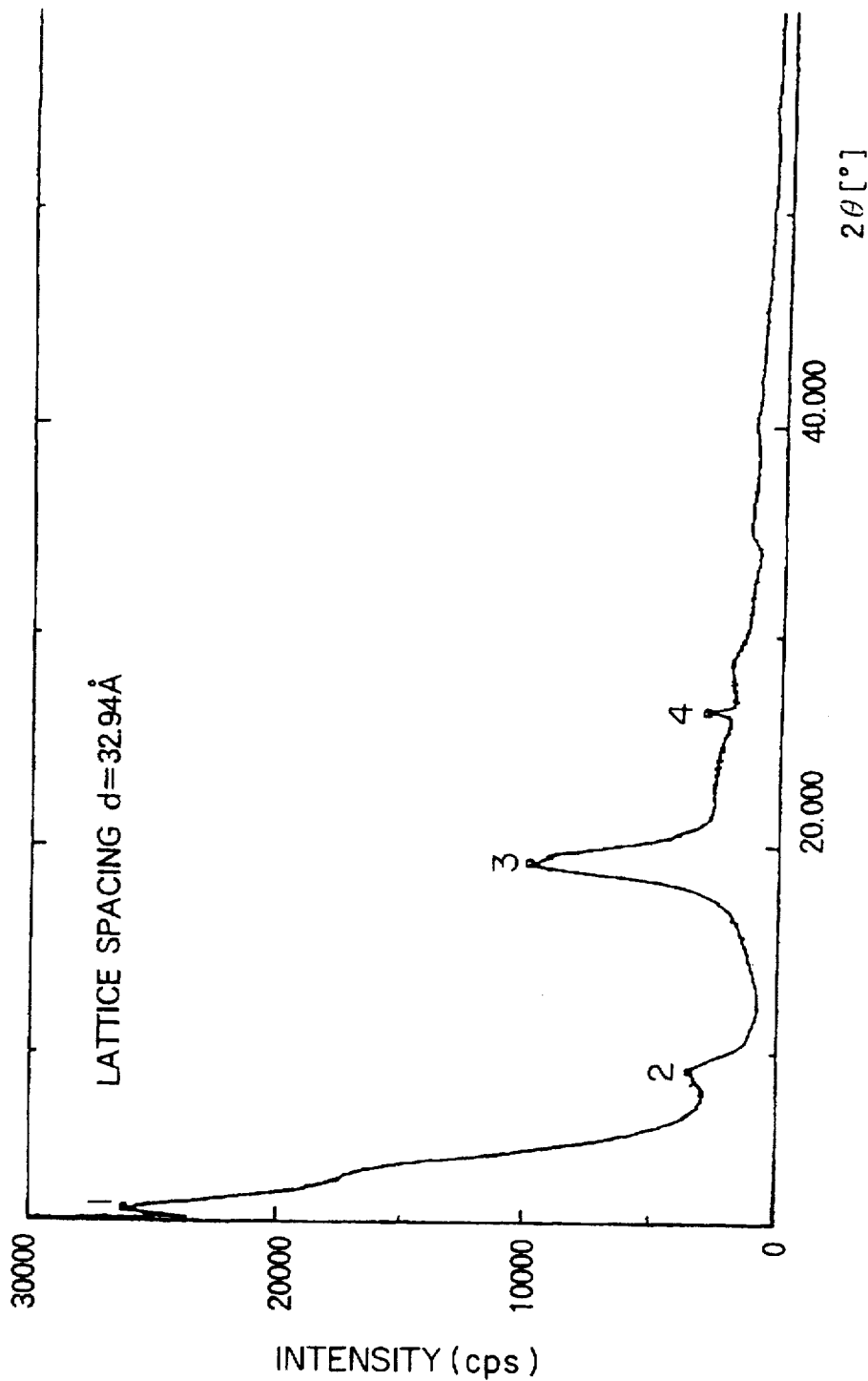

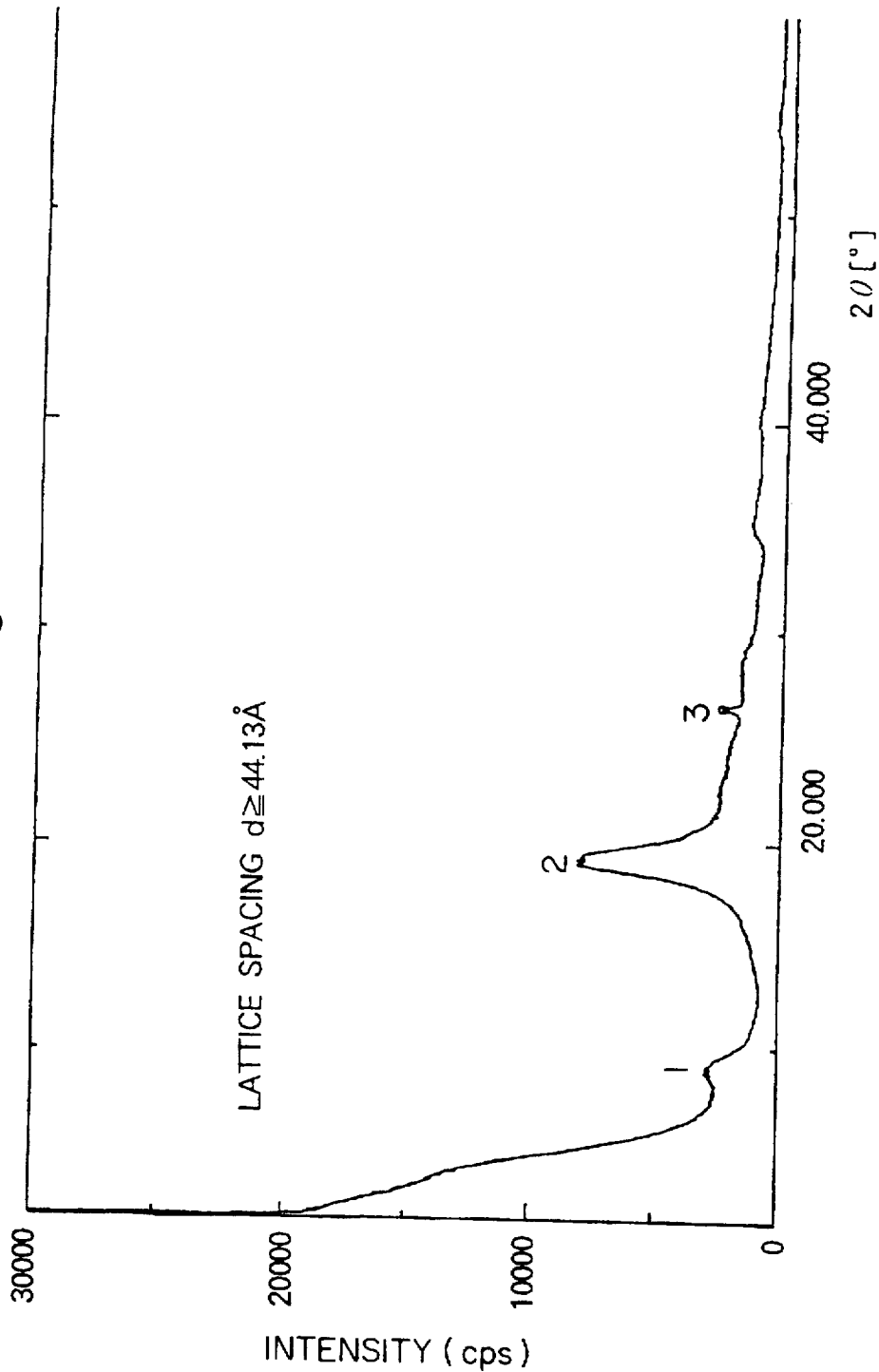

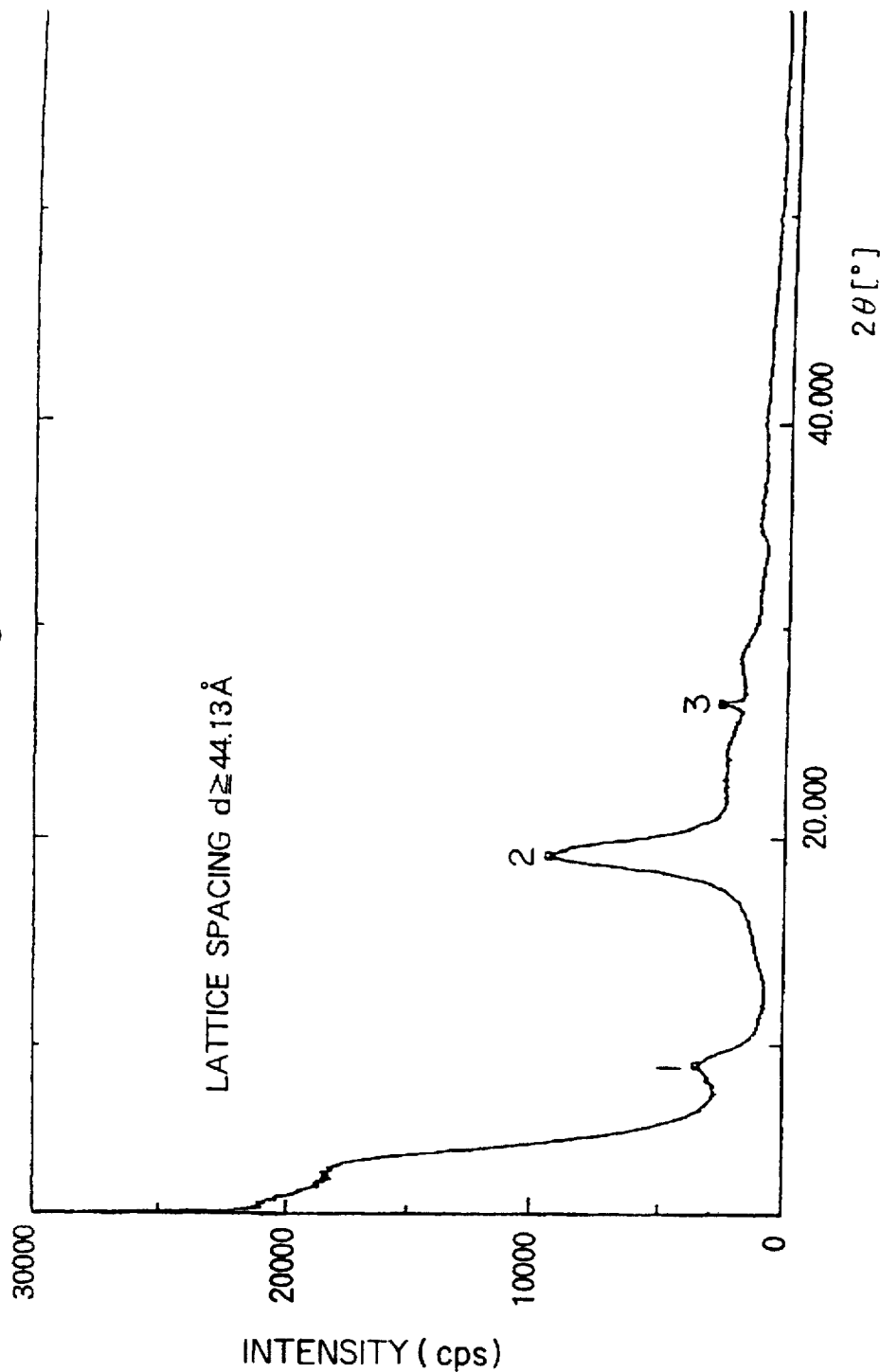

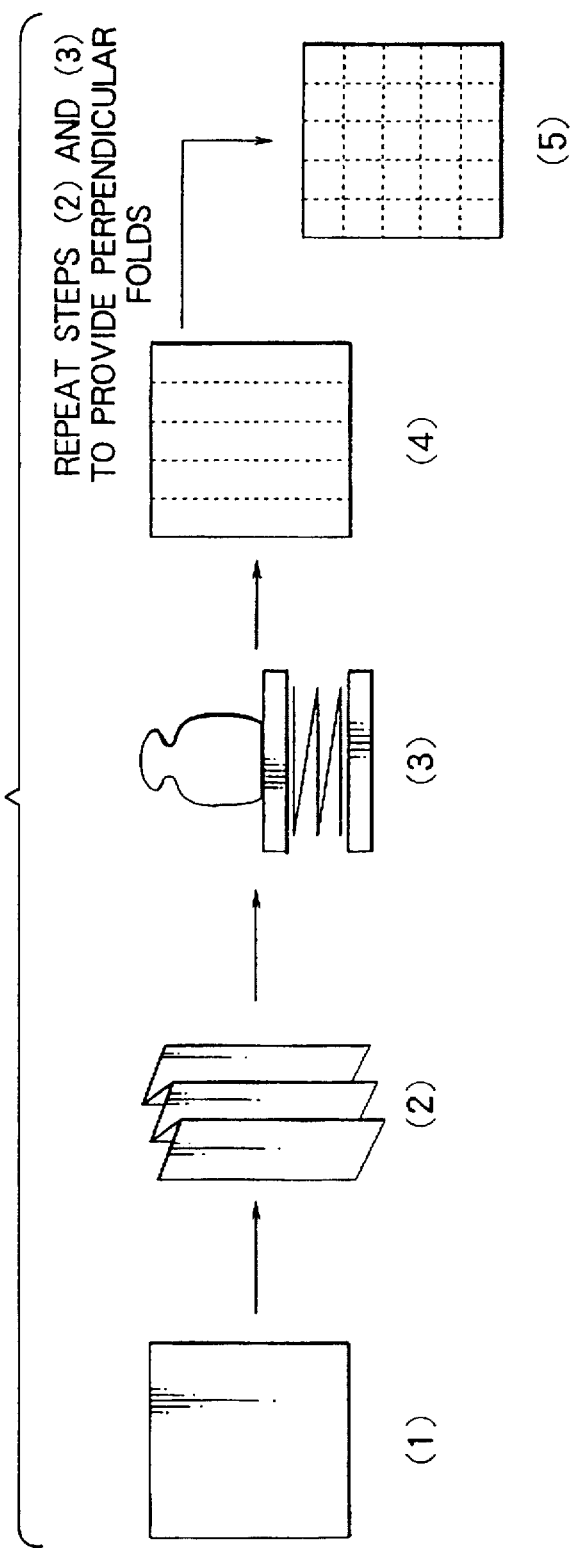

5,766,751

1

LAMINATE, LAMINATE FILM AND SHAPED ARTICLE COMPRISING INORGANIC LAMINAR COMPOUND

This application claims benefit of International application PCT/JP/00073, filed Jan. 24, 1995.

TECHNICAL FIELD

The present invention relates to a laminate or laminate film which comprises at least one layer (or at least a portion) comprising a resin composition having an excellent gas barrier property, and a shaped (or molded) article comprising a portion of such a resin composition.

BACKGROUND ART

A film having a gas barrier property (gas barrier film) as a kind of functional film has widely been put to practical use in the fields of food, medicine, agricultural chemicals, cosmetics, etc., wherein contents are stored or protected while the "quality" of the contents is liable to cause a problem. One of such important usage includes a field of "packaging".

Packaging, i.e., making or putting an object into a package or wrap, or the material therefor is desired to have a wide variety of functions. For example, such functions of packaging may include: mechanical protective property, safety, sanitary property, workability, adaptability to goods (transparency, printability, heat sealing property), utility, profitability, etc. Among these functions, various "gas barrier property", as one of the factors in the above-mentioned storability or protective property, is an important property for affecting the storability of the above contents such as food. Along with recent diversification in the form of goods distribution or in packaging technique, intensification of additive control, change in taste, etc., the importance of the gas barrier property has been increased more and more. On the other hand, the gas barrier property has heretofore been a serious weak point of ordinary plastic materials.

Factors which can deteriorate a food include oxygen, light, heat and/or moisture. Among these factors, oxygen has been considered to be a substance causing such deterioration. A material having a gas barrier property (gas barrier material) is a material which has a main function of effectively intercepting oxygen. Such a gas barrier material exhibits the function of intercepting oxygen, and simultaneously exhibits a function which is essential for various measures for controlling the deterioration of food (such as gas charging and vacuum packaging). The gas barrier material has been utilized very effectively in many fields such as food packaging inclusive of confectionery bags, bags for dried bonito, pouches for retorted foods, containers for carbonated drinks, etc., or packaging for cosmetics, agricultural chemicals, and medical use, on the basis of its barrier function to various species of gases such as oxygen, organic solvent vapors, aromas; or its function of preventing corrosion, odor, sublimation, etc., based on the barrier function thereof.

Among films comprising a thermoplastic resin, those films comprising oriented polypropylene, polyester, polyamide, etc., particularly have excellent mechanical property, heat resistance, transparency, etc., and therefore these films are widely used as a packaging material. However, in a case where a film comprising such a material is used for food packaging, since the barrier property thereof to a gas such as oxygen is insufficient, the food as the contents in the package is liable to be deteriorated due to degradation based on oxidation, or the function of aerobic bacteria, etc. Furthermore, in such a case, an aroma component of the food permeates the package to be diffused to the outside of the package. As a result, there tends to occur various problems such that the flavor of the food is lost, or the content is wetted with outside moisture due to the penetration of such moisture and the taste thereof becomes worse. Accordingly, when a film of the above-mentioned material such as polypropylene is used for food packaging, it is usual to adopt a method wherein another film (or layer) having an excellent gas barrier property is laminated onto the film of the above-mentioned material.

As a method of imparting a gas barrier property or increasing the gas barrier property of a resin, there has been known a method wherein an inorganic material in a flat shape is dispersed in a resin. For example, Japanese Laid-Open Patent Application (KOKAI) No. 148532/1987 (i.e., Sho 62-148532) describes a process for producing a film having a gas barrier property wherein a coating liquid composition comprising 100 wt. parts of a polyurethane resin solution (concentration: 30%) using 1,6-hexanepolycarbonatediol, 25 wt. parts of mica fine powder, and 60 wt. parts of dimethylformamide is applied onto a base material having a releasability, and then is dried and peeled from the base material.

In addition, Japanese Laid-Open Patent Application No. 043554/1989 (i.e., Sho 64-043554) describes a process for producing a film wherein mica having an average length of 7 μm and an aspect ratio of 140 is added into an aqueous methanol solution of an ethylene-vinyl alcohol copolymer, and the resultant mixture is poured into cold water, and then subjected to filtration and drying to provide pellets, which are then formed into a film.

Furthermore, Japanese Laid-Open Patent Application No. 93542/1991 (i.e., Hei 3-93542) describes a process for producing a coated plastic film wherein a coating composition comprising a silyl group-containing modified polyvinyl alcohol and synthetic hectorite in a wt. ratio of 50:50, is applied onto a biaxially oriented polyethylene terephthalate (OPET), and then subjected to drying and heat treatment (130 to 150° C.).

However, such films provided by the above-mentioned conventional technique still do not have a sufficient gas barrier property, and is not a satisfactory film having a gas barrier property suitable for practical use.

As one of the important measures for imparting a gas barrier property, there has heretofore been known a method wherein a thin film is formed on at least one side of the surfaces of another film comprising a thermoplastic resin by use of a metal such as aluminum, or an oxide such as silica and alumina through vacuum vapor deposition, etc., so as to impart a barrier property to the resin film. However, during the formation of such a thin film, pin holes are liable to be formed and performances thereof tend to be considerably decreased on the basis of deformation of the film due to insufficient flexibility or mechanical strength of the thin film. As a result, such a process hardly imparts a satisfactory gas barrier property to the film.

An object of the present invention is to provide a laminate, a laminate film or a shaped article which has solved the above-mentioned problems.

A more specific object of the present invention is to provide a laminate, a laminate film or a shaped article having a gas barrier property at a good level.

DISCLOSURE OF INVENTION

As a result of earnest study, the present inventors have found that a laminate, a laminate film or a shaped article having an excellent gas barrier property has been provided by constituting a laminate, a laminate film or a shaped article while a layer comprising a substance having a gas barrier property is further combined with a layer (or portion) of a resin composition comprising a resin and an inorganic laminar compound dispersed therein and having a specific aspect ratio.

The laminate according to the present invention is based on the above discovery and comprises: a layer comprising a substance having a gas barrier property; and at least one layer which is disposed on the gas barrier substance layer and comprises a resin composition comprising a resin and an inorganic laminar compound having an aspect ratio of not less than 50 and not more than 5000.

The present invention also provides a laminate having a shape in the form of a laminate film.

The present invention further provides a laminate film comprising: a base material; and at least one laminate disposed thereon, which comprises a layer comprising a substance having a gas barrier property; and a layer disposed on the gas barrier substance layer and comprising a resin composition comprising a resin and an inorganic laminar compound having an aspect ratio of not less than 50 and not more than 5000.

The present invention further provides a shaped article, which comprises, at least a portion thereof, a laminate portion comprising: a layer comprising a substance having a gas barrier property; and a layer disposed on the gas barrier substance layer and comprising a resin composition comprising a resin and an inorganic laminar compound having an aspect ratio of not less than 50 and not more than 5000.

BRIEF DESCRIPTION OF DRAWINGS

FIG. 14 is a graph showing X-ray diffraction peaks of a composition having a lattice spacing d=19.62 angstrom (pattern of the above FIG. 2).

FIG. 15 is a graph showing X-ray diffraction peaks of a composition having a lattice spacing d=32.94 angstrom (pattern having the above patterns of FIGS. 2 and 3).

FIG. 16 is a graph showing X-ray diffraction peaks of a composition having a lattice spacing $d \geq 44.13$ angstrom (pattern of the above FIG. 3).

FIG. 17 is a graph showing X-ray diffraction peaks of a composition having a lattice spacing $d \geq 44.13$ angstrom (pattern of the above FIG. 3).

FIG. 18 is a schematic view for illustrating a folding method used in a "folding test" as described hereinafter.

BEST MODE FOR CARRYING OUT THE INVENTION

Figure 1:
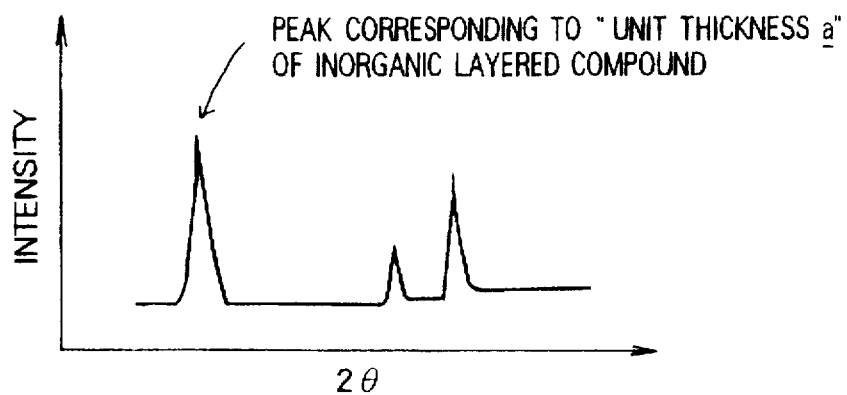
FIG. 1 is a graph schematically showing a relationship between an X-ray diffraction peak of an inorganic laminar compound and a "unit thickness a" of the compound.

Hereinbelow, the present invention will be described in detail with reference to the accompanying drawings, as desired.

The "inorganic laminar compound" to be used in the present invention refers to an inorganic compound wherein unit crystal layers are mutually stacked to form a layer structure. In other words, "layered compound" refers to a compound or substance having a layer structure. The "layer structure" is a structure wherein planes, each of which comprises atoms strongly bonded to each other on the basis of covalent bonds, etc., so as to form close packing, are stacked substantially parallel on the basis of weak bonding power such as Van der Waals force.

The "inorganic laminar compound" usable in the present invention is not particularly limited, as long as the "aspect ratio" thereof measured by a method described hereinafter is not less than 50 and not more than 5000. In view of the gas barrier property, the aspect ratio may preferably be not less than 100 (particularly, not less than 200).

When the above aspect ratio is less than 50, the exhibition of the gas barrier property becomes insufficient. On the other hand, is technically difficult to obtain an inorganic laminar compound having an aspect ratio exceeding 5000, and further such a compound is costly or expensive from an economic viewpoint. In view of easiness in production of an inorganic laminar compound, the aspect ratio may preferably be not more than 2000 (more preferably, not more than 1500). In view of the balance between the gas barrier property and easiness in production, the aspect ratio may preferably be in the range of 200–3000.

In view of the film forming property or formability in the form of a film or shaped article, the "particle size" measured by a method therefor described hereinafter may preferably be not more than 5 µm. When the particle size exceeds 5 µm, the film forming property or formability of a resin composition tends to be decreased. In view of the transparency of a resin composition, the particle size may more preferably be not more than 3 µm. In a case where the resin composition according to the present invention is used for a purpose (e.g., purpose of food packaging) wherein the transparency is important, the particle size may particularly preferably be not more than 1 µm.

Specific examples of the inorganic laminar compound may include: graphite, phosphoric acid salt-type derivative compounds (such as zirconium phosphate-type compound), chalcogen-type compounds, clay-type minerals, etc. The "chalcogen-type compound" used herein refers to a di-chalcogen type compound which comprises an element of Group IV (Ti, Zr, Hf), Group V (V, Nb, Ta), and/or Group VI (Mo, W), and represented by a formula of $MX_2$, wherein M denotes an element as described above, and X denotes a chalcogen (S, Se, Te).

In view of easiness in the provision of a large aspect ratio, it is preferred to use an inorganic laminar compound having a property such that it is swollen or cleft in a solvent.

The degree of the "swelling or cleavage" of the inorganic laminar compound to be used in the present invention in a solvent may be evaluated by the following "swelling or cleavage" test. The inorganic laminar compound may preferably have a swelling property of not less than about 5 (more preferably, not less than about 20) according to the following swelling test. On the other hand, the inorganic laminar compound may preferably have a cleavage property of not less than about 5 (more preferably, not less than about 20) according to the following cleavage test. In these cases, a solvent having a density smaller than the density of the inorganic laminar compound is used. When the inorganic laminar compound is a natural clay mineral having a swelling property, it is preferred to use water as the above solvent.

<Swelling property test>

2 g of an inorganic laminar compound is slowly added to 100 mL of a solvent, while 100 mL-graduated cylinder is used as a container. The resultant mixture is left standing, and thereafter the volume of the former (the dispersion layer of the inorganic laminar compound) is read from the graduation corresponding to the interface between the dispersion layer of the inorganic laminar compound and the supernatant after 24 hours at 23° C. When the resultant value is larger, the swelling property is higher.

<Cleavage property test>

30 g of an inorganic laminar compound is slowly added to 1500 mL of a solvent, and is dispersed by means of a dispersion machine (mfd. by Asada Tekko K.K., Despa MH-L, vane diameter=52 mm, rotating speed=3100 rpm, container capacity=3 L, distance between the bottom face and the vane=28 mm) for 90 minutes at a peripheral speed of 8.5 m/sec (23° C.). Thereafter, 100 mL of the resultant dispersion liquid is taken out and placed into a graduated cylinder, and then is left standing for 60 minutes. Then, the volume of the dispersion layer of the inorganic laminar compound is read from the graduation corresponding to the interface between the dispersion layer of the inorganic laminar compound and the supernatant.

As the inorganic laminar compound capable of being swollen or cleft in a solvent, it is particularly preferred to use a clay mineral having a swelling or cleaving property. The clay minerals may be classified into two types, i.e., one type having a two-layer structure, which comprises a silica tetrahedral layer, and an octahedral layer disposed thereon and comprising a central metal such as aluminum and magnesium; and another type having a three-layer structure, which comprises an octahedral layer comprising a central metal such as aluminum and magnesium, and a silica tetrahedral layer disposed on the both sides of the octahedral layer so as to sandwich the octahedral layer.

Specific examples of the former two-layer type may include: kaolinite series, antigorite series, etc. Specific examples of the latter three-layer type may include: smectite series, vermiculite series, mica series, etc., depending on an interlayer cation contained therein.

More specific examples of the clay mineral may include: kaolinite, dickite, nacrite, halloysite, antigorite, chrysotile, pyrophyllite, montmorillonite, hectorite, tetrasilylic mica, sodium taeniolite, muscovite, margarite, talc, vermiculite, phlogopite, xanthophyllite, chlorite, etc.

<Particle size>

In view of difficulty, etc., in measuring the (true) particle size in a resin composition, in the present invention, a value (L) which may be determined in a solvent by a dynamic light scattering method (photon correlation spectroscopy) as described hereinafter is used as the "particle size" of the inorganic laminar compound. The "dynamic light scattering method" used herein is a particle size-measuring method utilizing scattering phenomenon of laser light, wherein scattering light from particles conducting Brownian movement, i.e., scattering light with fluctuation depending on the moving velocity or particle size (grain size) of those particles, is detected, and an information on the particle size is obtained by calculation.

According to the present inventors' knowledge, the particle size of the inorganic laminar compound contained in a resin may be approximated by the above-mentioned "particle size in a solvent" obtained by the dynamic light scattering method. For example, in a case where an inorganic laminar compound which has sufficiently been swollen with a solvent (which is the same kind of the solvent used in the dynamic light scattering method) is combined with a resin, the particle size of the inorganic laminar compound contained in the resin may sufficiently be approximated by the "particle size in a solvent" obtained by the dynamic light scattering method.

(Aspect ratio)

In the present invention, the aspect ratio (Z) of the inorganic laminar compound is a ratio which may be determined on the basis of a relationship of $Z=L/a$. In this relationship, L is the particle size of an inorganic laminar compound determined by the dynamic light scattering method in a solvent, and a is the "unit thickness" of the inorganic laminar compound. The "unit thickness a" is a value which is determined on the basis of the measurement of the inorganic laminar compound alone, by powder X-ray diffraction method, etc., as described hereinafter. More specifically, as schematically shown in the graph of FIG. 1 wherein the abscissa denotes $2\cdot\theta$, and the ordinate denotes the intensity of X-ray diffraction peaks, the "unit thickness a" is a spacing obtained from the Bragg's equation ($n\cdot\lambda = 2\cdot D \cdot \sin\theta$, $n=1, 2, 3 \ldots$), wherein $\theta$ denotes the angle corresponding to the peak having the lowermost angle among those of the observed diffraction peaks. With respect to the details of the powder X-ray diffraction method, a book entitled "Kiki-Bunseki no Tebiki (Handbook on Instrumental Analysis) (a)", page 69, (1985), editorially supervised by Jiro SHIOKAWA, published by KAGAKU DOJIN K.K. may be referred to.

In correspondence to the above relationship of $Z=L/a$ based on the measurement of the inorganic laminar compound alone, when the resin composition according to the present invention is subjected to the powder X-ray diffraction method, the lattice spacing d of the inorganic laminar compound contained in the resin composition may usually be obtained.

Figure 2:
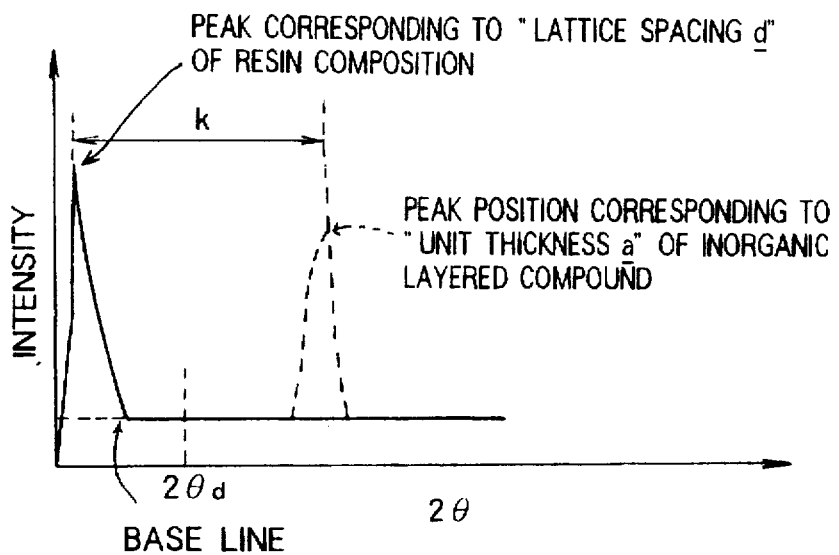
FIG. 2 is a graph schematically showing a relationship between an X-ray diffraction peak of a resin composition containing an inorganic laminar compound and a "lattice spacing (or distance between lattice planes) d" of the compound.

More specifically, as schematically shown in the graph of FIG. 2 wherein the abscissa denotes $2\cdot\theta$, and the ordinate denotes the intensity of X-ray diffraction peaks, the "lattice spacing d" ($a<d$) is a spacing corresponding to the peak having the lowermost angle among the observed diffraction peaks appearing on the lower angle (larger spacing) side as compared with the position of the diffraction peak corresponding to the above-mentioned "unit thickness a". In a case where the above peak corresponding to the "lattice spacing d" is superposed on a halo (or background) as schematically shown in the graph of FIG. 2 so that it is difficult to detect such a peak, the area of a portion obtained by subtracting the base line portion from a portion corresponding to an angle lower than $2\cdot\theta_d$, is treated as a peak corresponding to the "lattice spacing d". The $\theta_d$ used herein is an angle of diffraction corresponding to "(unit length a)+(width of one resin chain)". With respect to the details of a method of determining the "lattice spacing d", a book entitled "Nendo no Jiten (Encyclopedia of Clay)", page 35 et seq. and page 271 et seq., (1985), edited by Shuici IWAO et al., published by ASAKURA SHOTEN K.K. may be referred to.

The integrated intensity of the diffraction peak (corresponding to the "lattice spacing d") observed in the powder X-ray diffraction of a resin composition may preferably have a relative ratio of not less than 2 (more preferably, not less than 10), with respect to the integrated intensity of the diffraction peak as a standard (corresponding to the "lattice spacing a").

In general, the difference between the above lattice spacing d and the "unit thickness a", namely, the value of $k=(d-a)$ (when converted into "length") may be equal to, or larger than the width of one resin chain constituting the resin composition ($k=(d-a) \geq$ (width of one resin chain) ). The "width of one resin chain" may be determined by simulation calculation, etc. (as described in, e.g., a book entitled "KOBUNSHI KAGAKU JORON (Introduction to Polymer Chemistry)", pages 103–110 (1981), published by KAGAKU DOJIN K.K.). In the case of polyvinyl alcohol, this width is 4–5 Å (angstrom), and in the case of water molecules, this width is 2–3 Å.

It is considered that the above-mentioned aspect ratio $Z=L/a$ is not always equal to "true aspect ratio" of the inorganic laminar compound in the resin composition. However, it is reasonable to approximate the "true aspect ratio" by the aspect ratio Z, for the following reason.

Thus, it is extremely difficult to directly measure the "true aspect ratio" of the inorganic laminar compound contained in a resin composition. On the other hand, in a case where there is a relationship of $a<d$ between the lattice spacing d determined by the powder X-ray diffraction method for the resin composition, and the "unit thickness a" determined by powder X-ray diffraction method for the inorganic laminar compound alone; and the value of ($d-a$) is not smaller than the width of one resin chain in the resin composition, it is assumed that the resin is inserted between layers of the inorganic laminar compound. Accordingly, it is sufficiently reasonable to approximate the thickness of the inorganic laminar compound in the resin composition by the above-mentioned "unit thickness a", i.e., to approximate the "true aspect ratio" in the resin composition by the above-mentioned "aspect ratio Z" of the inorganic laminar compound alone.

As described above, it is extremely difficult to measure the true particle size in the resin composition. However, it may be considered that the particle size of the inorganic laminar compound in the resin is quite near to the particle size in a solvent, when the inorganic laminar compound, which has fully been swollen with a solvent of the same kind as that of the solvent used in the dynamic light scattering method, is combined with a resin to provide a resin composition.

However, it is hardly considered that the particle size L determined by the dynamic light scattering method exceeds the major axis length $L_{max}$ of the inorganic laminar compound, and therefore the possibility that true aspect ratio ($L_{max}/a$) is smaller than the "aspect ratio Z" used in the present invention (i.e., the possibility of $L_{max}/a<Z$), is theoretically very small.

In view of the above-mentioned two points, it is considered that the definition of the aspect ratio Z used in the present invention is sufficiently reasonable. Thus, in the present specification, the "aspect ratio" or "particle size" means the "aspect ratio Z" as defined above, or "particle size L" determined by the dynamic light scattering method.

<Solvent>

In the present invention, the solvent for swelling the inorganic laminar compound is not particularly limited, as long as it is usable in the production of the resin composition. For example, when a natural clay mineral having a swelling property is used as an inorganic laminar compound, specific examples of the solvent may include: water, alcohols such as methanol; polar solvent such as dimethylformamide, dimethyl sulfoxide, and acetone; or mixtures comprising two or more species selected from these solvents. It is preferred to use water or an alcohol such as methanol having a relatively low boiling point, in view of easiness in the removal thereof after the film formation or shaping of the resin composition.

(Resin)

The "resin" constituting the resin composition together with the inorganic laminar compound in the present invention is not particularly limited, as long as it enables the stable dispersion or retention of the inorganic laminar compound.

In view of the gas barrier property of the resin composition, it is preferred to use, e.g., poly vinyl alcohol (PVA), ethylene-vinyl alcohol copolymer (EVOH), polyvinylidene chloride (PVDC), polyacrylonitrile (PAN), polysaccharide, polyacrylic acid and esters thereof, etc.

(Highly hydrogen-bonding resin)

The "resin" constituting the resin composition may preferably be a highly hydrogen-bonding resin, in view of the gas barrier property of the composition. The "highly hydrogen-bonding resin" may preferably a resin having a weight percent (percent by weight) of a hydrogen-bonding group and/or ionic group (in a case where the resin contains two or more of these groups, total of these groups) per unit weight of the resin, which is 10% or more, more preferably about 20%–60% (particularly, about 30%–50%).

The "hydrogen-bonding group" used herein refers to a group having at least one hydrogen atom directly bonded to a hetero atom (i.e., atom other than carbon). Specific examples of the hydrogen-bonding group may include: hydroxyl group, amino group, thiol group, carboxyl group, sulfone group, phosphoric acid group, etc.

On the other hand, the "ionic group" refers to a group having at least one of positive or negative charge, which is localized so as to enable the hydration of a water molecule. Specific examples of the ionic group may include: carboxylate group, sulfonic acid ion group, phosphoric acid ion group, ammonium group, phosphonium group, etc.

Preferred examples of the hydrogen-bonding group or ionic group contained in the highly hydrogen-bonding resin may include: hydroxyl group, amino group, carboxyl group, sulfonic acid group, carboxylate group, sulfonic acid ion group, ammonium group, etc.

The content of the hydrogen-bonding group or ionic group may preferably be measured, e.e., by utilizing a technique of nuclear magnetic resonance (NMR), such as $^1$H-NMR and $^{13}$C-NMR.

The highly hydrogen-bonding resin usable in the present invention is not particularly limited, as long as it has a highly hydrogen-bonding property as described above. Specific examples thereof may include: polyvinyl alcohol, ethylene-vinyl alcohol copolymer having a vinyl alcohol fraction of not less than 41 mol %; polysaccharide such as hydroxymethyl cellulose, hydroxyethyl cellulose, carboxymethyl cellulose, amylose, amylopectin, pluran, cardran, xanthan, chitin, chitosan and cellulose; polyacrylic acid, sodium polyacrylate, polybenzenesulfonic acid, sodium polybenzenesulfonate, polyethyleneimine, polyallylamine, ammonium salt thereof, polyvinyl thiol, polyglycerin, etc.

Particularly preferred examples of the highly hydrogen-bonding resin in the present invention may include: polyvinyl alcohol and/or polysaccharide (or derivatives thereof). In the case an ideal polyvinyl alcohol, i.e., —(CH$_2$CHOH)$_n$—, the weight percent of the OH group as the above-mentioned hydrogen-bonding group is (17/44)×100= about 39%.

In the present invention, the "polyvinyl alcohol" refers to a polymer predominantly comprising a monomer unit of vinyl alcohol. Specific examples of such a "polyvinyl alcohol" may include: a polymer (exactly, a copolymer of vinyl alcohol and vinyl acetate) obtained by subjecting the acetic acid portion of a vinyl acetate polymer to hydrolysis or ester interchange (saponification), and polymers obtained by saponifying a polymer such as vinyl trifluoroacetate polymer, vinyl formate polymer, vinyl pivalate polymer, t-butyl vinyl ether polymer, and trimethylsilyl vinyl ether polymer. With respect to the details of the "polyvinyl alcohol", a book entitled "PVA no Sekai (World of PVA)" edited by POVAL-KAI (POVAL Society), (1992), published by KOBUNSI KANKO-KAI (Polymer Publishing Society) K.K.; and a book entitled "Poval" written by Nagano et al. (1981), published by KOBUNSI KANKO-KAI may be referred to.

The degree of the "saponification" in the polyvinyl alcohol may preferably be not less than 70%, more preferably, not less than 85%, in terms of mole percentage. The degree of polymerization of the polyvinyl alcohol may preferably be not less than 100 and not more than 5000 (more preferably, not less than 200 and not more than 3000).

(Polysaccharide and derivatives thereof)

On the other hand, "polysaccharide and derivatives thereof" usable in the present invention may also include biopolymers which are synthesized in a living organism on the basis of condensation polymerization, and those obtained by chemically modifying these biopolymers. Specific examples of the "polysaccharide and derivatives thereof" may include: cellulose, cellulose derivatives such as hydroxymethyl cellulose, hydroxyethyl cellulose, and carboxymethyl cellulose; and amylose, amylopectin, pullulan, curdlan, xanthan, chitin, chitosan etc.

(Crosslinking agent for hydrogen-bonding group)

In a case where a highly hydrogen-bonding resin is used as a resin constituting the above-mentioned resin composition, a crosslinking agent for a hydrogen-bonding group may be used as desired, for the purpose of improving the water resistance of the highly hydrogen-bonding resin (barrier property after water-resistance environmental test thereof).

The crosslinking agent for the hydrogen-bonding group usable in the present invention is not particularly limited. Preferred examples of the crosslinking agent may include: titanium-type coupling agent, silane-type coupling agent, melamine-type coupling agent, epoxy-type coupling agent, isocyanate-type coupling agent, copper compound, zirconia compound, etc. In view of the water resistance, a zirconia compound may particularly preferably be used.

Specific examples of the zirconia compound may include: halogenated zirconium such as zirconium oxychloride, hydroxy zirconium chloride, zirconium tetrachloride, and zirconium bromide; zirconium salts of mineral acid such as zirconium sulfate, basic zirconium sulfate, and zirconium nitrate; zirconium salts of organic acid such as zirconium formate, zirconium acetate, zirconium propionate, zirconium caprylate, and zirconium stearate; zirconium complex salts such as zirconium ammonium carbonate, zirconium sodium sulfate, zirconium ammonium acetate, zirconium sodium oxalate, zirconium sodium citrate, zirconium ammonium citrate; etc.

The amount of the addition of the crosslinking agent for a hydrogen-bonding group is not particularly limited, but the crosslinking agent may preferably be used so as to provide a ratio (K=CN/HN), i.e., ratio of the mole (CN) of the crosslinking-providing group of the crosslinking agent to the mole (HN) of the hydrogen-bonding group of the highly hydrogen-bonding resin, which is not less than 0.001 and not more than 10. The above molar ratio K may more preferably be in the range of not less than 0.01 and not more than 1.

(Transparency)

A film or shaped article comprising the resin composition according to the present invention may preferably have a transparency, in view of advantage in a case where it is used for a purpose such as packaging. The transparency may preferably have a degree of not less than 80% (more preferably, not less than 85%) in terms of transmittance of whole light at a wavelength of 500 nm. For example, such a transparency may preferably be measured by means of a commercially available spectrophotometer (automatic recording spectrophotometer Model-330, mfd. by Hitachi Seisakusho K.K.).

(Oxygen permeability)

The film or shaped article comprising the resin composition according to the present invention has a gas barrier property. The gas barrier property may preferably be not more than 0.5 cc/m²·day·atm, more preferably, not more than 0.2 cc/m²·day·atm (particularly preferably, not more than 0.15 cc/m²·day·atm), in terms of an oxygen permeability under the conditions of 30° C. and 60% RH (relative humidity).

(Resistance to folding)

The film or shaped article comprising the resin composition according to the present invention may preferably have a folding (or bending) resistance. The folding resistance may preferably be 20 or less, more preferably 10 or less (particularly preferably, 3 or less), in terms of an increment ratio R in oxygen permeability defined by $R=P_F/P_I$ (wherein $P_F$ denotes the oxygen permeability after a folding test, and $P_I$ denotes the oxygen permeability before the folding test), when the resin composition, laminate, or laminate film according to the present invention is subjected to a "folding test" as described hereinafter. At the time of the folding test, the resin composition is subjected to the folding test, after a layer comprising the resin composition and having a thickness after drying of 0.8 μm is formed on a biaxially oriented polypropylene film with a coating of polyvinylidene chloride (thickness=25 μm, trade name: Senesee KOP, mfd. by Daicel K.K.) so that the entirety thereof is formed into a laminated film-type shape.

<Folding test>

A 33 cm-wide non-oriented polypropylene film (trade name: Pyren Film-CT, mfd. by Toyobo K.K., thickness 50 μm) is dry-laminated onto an inorganic laminar compound-containing layer (resin composition layer) side of a laminate film to be examined by means of a laminating machine (trade name: Test-Coater, mfd. by Yasui Seiki co.) under a pressure of 4 kg/cm² at a speed of 6 m/min., while using a urethane-type adhesive (trade name: Yunoflex-J3, mfd. by Sanyo Kasei K.K.) In an amount of 3 g/m² (solid content). The resultant dry-laminated film is then sampled to be formed into a test piece form having a length of 12 cm and a width of 12 cm.

The test piece is subjected to "folding" in the following manner. Thus, as shown in FIG. 18, the test piece (Step 1) is folded into an accordion-like shape having an interval of 1 cm by using hands (Step 2). The resultant test piece is then sandwiched between two flat plates of acrylic resin (dimensions: 15 cm×15 cm, thickness: about 5 mm). A load of 5 kg is applied to the resultant sandwich-like product, and the sandwich-like product is left standing for 30 min. in this state (Step 3). Then, the application of the load is removed and the test piece is once spread (Step 4). Thereafter, the spread test piece is again subjected to the above "folding" process (Steps 2 to 3) except that the test piece is provided with folds perpendicular to the "first folds" which have been produced above, to be folded into an accordion-like shape having an interval of 1 cm, whereby a "test piece after folding" (Step 5) is obtained.

The thus prepared "test piece after folding" is subjected to oxygen permeability measurement in a manner as described hereinafter. When pin-holes, etc., are formed in the inorganic laminar compound-containing layer during the above "folding", the resultant oxygen permeability tends to be increased.

(Resin composition)

With respect to the composition ratio (volume ratio) between the inorganic laminar compound and the resin used in the present invention, the volume ratio of inorganic laminar compound/resin (ratio at the time of "Shikomi" (mixing for preparation)) may preferably be in the range of 5/95 to 90/10, more preferably in the range of 5/95 to 50/50 (particularly preferably, in the range of 10/90 to 30/70). The volume ratio in the range of 5/95 to 30/70 is advantageous in view of flexibility as a film or shaped article. When the volume ratio (fraction) of the above inorganic laminar compound/resin is below 5/95, the gas barrier property tends to be decreased. On the other hand, when the above volume ratio exceeds 90/10, the resultant filmforming property or formability tends to be decreased.

In view of the suppression of a decrease in the barrier property due to folding, the volume ratio may preferably be not less than 7/93. On the other hand, in view of the flexibility or the suppression of releasability of the resin composition layer from the base material, the volume ratio may preferably be not more than 17/83. In other words, the volume ratio of (inorganic laminar compound/resin) in the range of 7/93 to 17/83 is particularly preferred, because the decrease in the barrier property due to the folding may particularly be suppressed, and great peeling strength may easily be obtained in such a range.

Such a volume ratio may be determined by dividing respectively the numerator value (weight of the inorganic laminar compound) and the denominator value (weight of resin) constituting the weight ratio at the time of the "mixing for preparation" of these components, by respective densities. In general, there can be a case wherein the density of a resin (e.g., polyvinyl alcohol) is somewhat different depending on the crystallinity thereof. In the above case, however, it is possible to calculate the volume ratio while assuming the crystallinity of the polyvinyl alcohol to be 50%.

(Production method)

The method of formulating or producing the above composition comprising an inorganic laminar compound and a resin is not particularly limited. In view of the homogeneity or easiness in handling at the time of the formulation, it is possible to adopt, e.g., a method (first method) wherein a solution obtained by dissolving a resin, and a dispersion obtained by preliminarily swelling or cleaving an inorganic laminar compound, are mixed with each other, and thereafter the solvent is removed; a method (second method) wherein a dispersion obtained by swelling or cleaving an inorganic laminar compound, is added to a resin, and thereafter the solvent is removed; a method (third method) wherein an inorganic laminar compound is added to a solution obtained by dissolving a resin to obtain a dispersion in which the inorganic laminar compound is swollen or cleft, and thereafter the solvent is removed; a method (fourth method) wherein an inorganic laminar compound and a resin are kneaded under heating; etc. In view of easiness in the provision of a large aspect ratio of the inorganic laminar compound, it is preferred to adopt the former three method (first to third methods).

In the former two methods (first to second methods), in view of improvement in the water resistance (barrier property after the water-resistance environmental test), it is preferred that the solvent is removed from the system and thereafter a thermal aging treatment is conducted at a temperature of not less than 110° C. and not more than 220° C. (more preferably, a temperature of not less than 130° C. and not more than 210° C.). The aging period of time is not particularly limited. In consideration of the necessity for a film temperature to reach at least a set temperature, for example, it is preferred to adopt an aging time of not less than 1 sec. and not more than 100 min. (more preferably, about 3 sec. to 10 min.) in the case of a drying method using a heating medium-contact type dryer such as hot-air dryer, in view of a balance between the water resistance and productivity.

The heat source to be used in the above aging treatment is not particularly limited. For example, it is possible to apply any of various methods such as those utilizing heat roll contact, heat medium contact (air, oil, etc.) infrared heating, and microwave heating.

The effect of improving the water resistance may remarkably be enhanced in a case where at least one (more preferably, both) of conditions such that the resin is a highly hydrogen-bonding resin, and/or the inorganic laminar compound is a clay mineral having a swelling property, is satisfied.

(Substance having gas barrier property)

The laminate, laminate film or shaped article according to the present invention has a feature such that a layer (or portion) comprising a resin composition comprising the above-mentioned (inorganic laminar compound/resin) and a layer (or portion) comprising a substance having a gas barrier property are combined with each other. The gas barrier substance may preferably be a substance having a gas barrier property of not more than 30 cc/m$^2$·day·atm, more preferably not more than 10 cc/m$^2$·day·atm (particularly preferably, not more than 2 cc/m$^2$·day·atm), in terms of oxygen permeability (barrier property of base material before surface treatment) under the condition of 30° C. and 60% RH (relative humidity).

The gas barrier substance usable in the present invention is not particularly limited, as long as it has a "gas barrier property" as described above. Preferred examples thereof may include: metals or oxides, ethylene-vinyl alcohol copolymer and/or polyvinylidene chloride, etc. Among these gas barrier substances, ethylene-vinyl alcohol copolymer and polyvinylidene chloride are substances having a film-forming property or film formability in itself.

(Metal or oxide)

In the present invention, in a case where a metal or oxide is used as a substance having a gas barrier property, the metal or oxide may preferably be used in the form of a layer or film. The "metal" to be used in such an embodiment is not particularly limited as long as it has a gas barrier property, but a metal having a stability in the air in the form of a film or thin film may preferably be used. In view of the stability in the air, it is preferred to use a metal (such as aluminum) such that the film surface is stabilized due to oxidation after the thin film formation.

On the other hand, the above-mentioned oxide is not particularly limited as long as it has a gas barrier property. Preferred examples of such an oxide may include: aluminum oxide, silicon oxide, titanium oxide, zinc oxide, etc.

In view of a balance between the gas barrier property and flexibility (or productivity), the film of the metal or oxide to be used in the present invention may preferably have a thickness of not less than 1 nm and not more than 1000 nm, more preferably not less than 10 nm and not more than 300 nm (particularly preferably, not less than 15 nm and not more than 150 nm).

The process for forming a film of the metal or oxide to be used in the present invention is not particularly limited. It is possible to use a vapor-phase deposition such as ordinary vacuum evaporation, CVD (chemical vapor deposition), and sputtering; and liquid-phase deposition such as sol-gel process.

In the present invention, the above-mentioned film of a metal or oxide may be formed on at least one surface side of a "resin film". The resin film to be used for such a purpose is not particularly limited. In view of the film strength, however, it is preferred to use, e.g., a biaxially oriented polyethylene terephthalate film, a biaxially oriented nylon film, a biaxially oriented polypropylene film, etc.

(Ethylene-vinyl alcohol copolymer)

In the present invention, in a case where the above-mentioned ethylene-vinyl alcohol copolymer is used as a gas barrier substance, it is preferred to use, as the ethylene-vinyl alcohol copolymer, a product obtained by co-polymerizing ethylene and vinyl acetate and then saponifying the resultant copolymerization product. The mole fraction of ethylene in such a case may preferably be in the range of 20–60 mol % (more preferably, 25–50 mol %). The method of forming the ethylene-vinyl alcohol copolymer into a film is not particularly limited. For example, it is possible to use ordinary extrusion molding such as inflation molding, casting or coating from emulsion, etc. The thickness of the film is not particularly limited, but may preferably be about 0.5–50 µm (more preferably, about 1–30 µm). In the case of extrusion-molded film, it is preferred to use a film which has been subjected to orientation treatment, in view of the film strength.

(Polyvinylidene chloride)

In the present invention, in a case where polyvinylidene chloride is used as the gas barrier substance, it is possible to use a polymer predominantly comprising a vinylidene chloride monomer (preferably, one having a mole fraction of vinylidene chloride monomer of 70 mol % or more, more preferably, 80 mol % or more) without particular limitation. The polyvinylidene chloride may also contain at least one of various kinds of copolymerization monomers, as desired.

The method of forming the polyvinylidene chloride into a film is not particularly limited. It is preferred to use ordinary extrusion molding using a T-type die, coating (so-called "K-coating") utilizing polyvinylidene chloride in an aqueous emulsion or solution form, etc. The thickness of the film is not particularly limited, but may preferably be about 0.5–50 µm (more preferably, about 1–30 µm). In the case of an extrusion film, it is preferred to use a film which has been subjected to orientation treatment, in view of film strength.

(Method of lamination onto gas barrier substance layer)

The method by which a layer of a resin composition containing an inorganic laminar compound is laminated on the above-mentioned layer of the gas barrier substance (such as thin film of metal or oxide, layer of ethylene-vinyl alcohol copolymer, and layer of polyvinylidene chloride) is not particularly limited. It is preferred to use a coating method wherein a coating liquid containing a resin composition is applied onto the surface of a base material or a layer of a gas barrier substance, and then dried and heat-treated; a method wherein a layer of a resin composition containing an inorganic laminar compound is laminated afterward onto a gas barrier substance layer; etc. The interface between the gas barrier substance layer and the resin composition layer may be subjected to treatment such as corona treatment and anchor coating treatment, as desired.

Specific examples of the coating method may include: gravure methods such as direct gravure method, reverse gravure method and micro-gravure method; roll coating methods such as twin-roll bead coating method, and bottom-feed triple reverse coating method; doctor knife method, die coating method, dip coating method, bar coating method, and coating method combining these coating methods.

(Laminate structure)

The laminate structure or shaped structure to be used in the present invention is not particularly limited, as long as it comprise, as at least a portion (or layer) thereof, a resin composition comprising a resin and an inorganic laminar compound having an aspect ratio of not less than 50 and not more than 5000. More specifically, the laminate or resin composition according to the present invention may be shaped into any of various forms such as film, sheet, and container.

Figure 4:
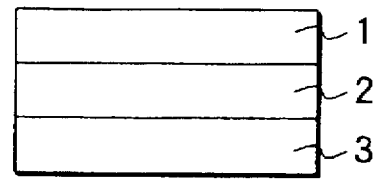
FIG. 4 is a schematic sectional view showing an embodiment of the laminate film structure according to the present invention, which comprises a resin film 3, a layer 2 disposed on the resin film 3 and comprising a substance having a gas barrier property, and a layer 1 containing an inorganic laminar compound disposed on the layer 2 of the gas barrier substance.

FIG. 4 is a schematic sectional view showing an embodiment wherein the laminate according to the present invention is shaped into the form of a laminate film. Referring to FIG. 4, the laminate film in this embodiment comprises a resin film 3, a layer 2 of a gas barrier substance disposed on the resin layer 3, and an inorganic laminar compound-containing (resin composition) layer 1 disposed on the gas barrier substance layer 2.

Figure 5:
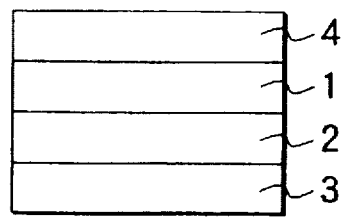
FIG. 5 is a schematic sectional view showing another embodiment of the laminate film structure according to the present invention, which further comprises a "base material 4 for laminating" disposed on the inorganic laminar compound-containing layer 1 as shown in the above FIG. 4 embodiment.
Figure 6:
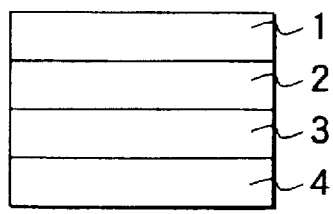
FIG. 6 is a schematic sectional view showing a further embodiment of the laminate film structure according to the present invention, which further comprises a "base material 4 for laminating" disposed on the resin film 3 side as shown in the above FIG. 4 embodiment.
Figure 7:
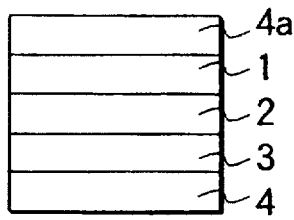
FIG. 7 is a schematic sectional view showing a further embodiment of the laminate film structure according to the present invention, which further comprises base materials 4 and 4a for laminating, respectively disposed on the inorganic laminar compound-containing layer 1 side and on the resin film 3 side as shown in the above FIG. 4 embodiment.

The laminate film according to the present may also have a laminate structure as shown in the schematic sectional views of FIGS. 5–7 as desired, in consideration of a balance between the gas barrier property, and mechanical strength such as film strength as the laminate. The laminate film in the embodiment of FIG. 5 further comprises a "base material 4 for lamination" on the inorganic laminar compound-containing layer 1 in the embodiment of the above FIG. 4. The laminate film in the embodiment of FIG. 6 further comprises a "base material 4 for lamination" on the resin film 3 in the embodiment of the above FIG. 4. In addition, the laminate film in the embodiment of FIG. 7 further comprises a "base material 4 or 4a for lamination" both on the inorganic laminar compound-containing layer 1 side, and on the resin film 3 side in the embodiment of the above FIG. 4.

Figure 8:
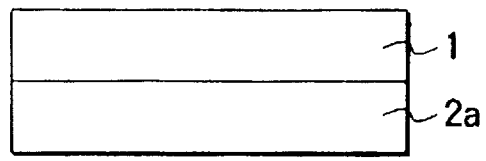
FIG. 8 is a schematic sectional view showing an embodiment of the laminate film structure according to the present invention, which comprises a layer 2a comprising a gas barrier substance having a film forming property, and a (resin composition) layer 1 containing an inorganic laminar compound disposed on the layer 2a of the gas barrier substance.

In a case where the above gas barrier substance itself has a film-forming property (e.g., in a case where the gas barrier substance comprises a resin such as ethylene-vinyl alcohol copolymer, and polyvinylidene chloride), the laminate according to the present invention may have a structure as shown in FIG. 8. Referring to FIG. 8, the laminate film in this embodiment comprises a layer 2a of a gas barrier substance, and an inorganic laminar compound-containing (resin composition) layer 1 disposed on the gas barrier substance layer 2a.

Figure 9:
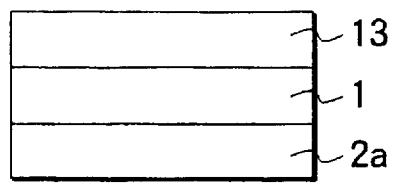
FIG. 9 is a schematic sectional view showing another embodiment of the laminate film structure according to the present invention, which further comprises a "base material 13 for laminating" disposed on the inorganic laminar compound-containing layer 1 as shown in the above FIG. 8 embodiment.
Figure 10:
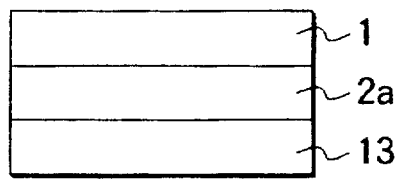
FIG. 10 is a schematic sectional view showing a further embodiment of the laminate film structure according to the present invention, which further comprises a "base material 13 for laminating" disposed on the side of the layer 2a of the gas barrier substance as shown in the above FIG. 8 embodiment.
Figure 11:
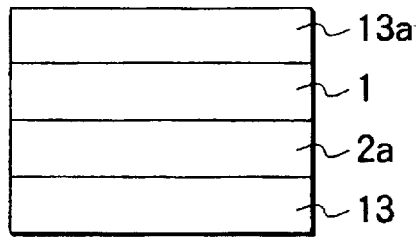
FIG. 11 is a schematic sectional view showing a further embodiment of the laminate film structure according to the present invention, which further comprises base materials 13 and 13a for laminating, respectively disposed on the inorganic laminar compound-containing layer 1 side and on the side of the layer 2a of the gas barrier substance as shown in the above FIG. 8 embodiment.

In such an embodiment, the laminate may also have a laminate structure as shown in schematic sectional views of FIGS. 9–11 as desired, in consideration of a balance between the gas barrier property, and mechanical strength such as film strength as a laminate. The laminate film in the embodiment of FIG. 9 further comprises a base material 13 for laminating on the inorganic laminar compound-containing layer 1 of the embodiment of above FIG. 8. The laminate film in the embodiment of FIG. 10 further comprises a base material 13 for laminating on the gas barrier substance layer 2a side of the embodiment of the above FIG. 8. In addition, the Laminate film in the embodiment of FIG. 11 further comprises a base material 13 or 13a for laminating both on the inorganic laminar compound-containing layer 1 side and on the gas barrier substance layer 2a side in the embodiment of above FIG. 8.

(Base material)

In the present invention, the base material to be used for the base material (or substrate) layer (e.g., the resin film 3 in the embodiment of FIG. 4) is not particularly limited. It is possible to use any of known or ordinary base materials such as resin, paper, aluminum foil, woody material, cloth, and nonwoven fabric, in accordance with the use or purpose thereof.

Specific examples of the resin constituting the base material may include: polyolefin-type resins such as polyethylene (low density, high density) ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer, and ionomer resin; polyester-type resins such as polyethylene terephthalate (PET), polybutylene terephthalate, and polyethylene naphthalate; amide-type resins such as nylon-6, nylon-6·6, meta-xylenediamine-adipic acid condensation polymer, and polymethyl methacrylimide; acrylic-type resins such as polymethyl methacrylate; styrene- or acrylonitrile-type resins such as polystyrene, styrene-acrylonitrile copolymer, styrene-acrylonitrile-butadiene copolymer, and polyacrylonitrile; hydrophobicity-imparted cellulose-type resins such as cellulose triacetate, and cellulose diacetate; halogen-containing resins such as polyvinyl chloride, polyvinylidene chloride, polyvinylidene fluoride, and polytetrafluoroethylene (Teflon); hydrogen-bonding resins such as polyvinyl alcohol, ethylene-vinyl alcohol copolymer and cellulose derivatives; engineering plastic-type resins such as polycarbonate resin, polysulfone resin, polyethersulfone resin, polyether ether ketone resin, polyphenylene oxide resin, polymethylene oxide resin, and liquid crystal resin; etc.

In a case where the laminate according to the present invention is shaped into a film form, as the outside layer (a layer constituting the outside of the laminate, e.g., the layer 3 or 4 in the embodiment of FIG. 5, the layer 4a in the embodiment of FIG. 7), it is preferred to dispose biaxially oriented polypropylene, polyethylene terephthalate, and nylon, biaxially oriented polypropylene, polyethylene terephthalate, and nylon having a polyvinylidene chloride coating (so-called "K-coat"), etc. On the other hand, as the inside layer (a layer constituting the inside or content side of the laminate, e.g., the layer 3 or 4 in the embodiment of FIGS. 4–5, the layer 4 or 4a in the embodiment of FIG. 6–7), it is preferred to dispose a resin having a good heat sealing property, such as polyolefin-type resin. Specific examples of such a polyolefin-type resin may include: polyethylene (low density, high density) ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer, ionomer resin, etc.

(Resin composition layer)

The thickness of a resin composition comprising an inorganic laminar compound and a resin is not particularly limited. While the thickness of this resin composition layer is somewhat different depending on the kind of a base material to be combined therewith, or an intended barrier performance, the thickness may preferably be not more than 10 μm in terms of the thickness after drying. In a case where a higher transparency is demanded, the thickness may preferably be not more than 2 μm (more preferably, not more than 1 μm) in terms of thickness after drying. When the thickness is not more than 1 μm, it is considerably advantageous in view of the transparency as the resultant laminate. Accordingly, such a thickness is particularly preferred for a use wherein transparency is particularly demanded (e.g., use for food packaging).

The thickness of the resin composition layer does not have a particular lower limit. In view of provision of a sufficient gas barrier property, the thickness may preferably be 1 nm or larger, more preferably 10 nm or larger (particularly preferably, 100 nm or larger).

(Additive)

In addition, it is also possible to mix with or add to the laminate or laminate film according to the present invention as desired, any of various additives such as ultraviolet light absorbing agent, colorant, and antioxidant, within a range wherein the effect of the present invention is not substantially impaired. Further, it is of course possible to use an adhesive or printing ink, as desired, e.g., at the time of laminating operation.

In the present invention, the shape or form of a product is not particularly limited as long as it comprises, as at least a layer (or a portion) thereof, the above-mentioned laminate or laminate film according to the present invention. More specifically, the product may be any of various forms inclusive of laminate, or shaped or molded product (e.g., container or vessel such as bottle, tray, and cup), etc.

Hereinbelow, the present invention will be described in detail with reference to Examples, by which the present invention is not limited.

(Examples)

The methods of measuring various physical properties used in the present specification are described below.

<Oxygen permeability>

Oxygen permeability was measured by using a method according to Japanese Industrial Standard (JIS) (JIS K-7126).

More specifically, a sample film (test piece) was mounted to a commercially available oxygen permeability measuring apparatus (trade name: OX-TRAN 10/50A, mfd. by MOCON Co. U.S.A.), and the oxygen permeability was measured under the measuring conditions of a temperature of 31° C. (humidity-controlled thermostat=21° C.). At this time, the relative humidity was about 61%. In this measurement, the oxygen permeability of the sample film was continuously measured, and the oxygen permeability at a point of time at which the oxygen permeability became substantially constant (usually, about several hours to three days after the initiation of the measurement) was used as the data thereof in this specification. When the oxygen transmission is represented by the ordinate of a graph, and the time t is represented by the abscissa thereof, the period of time ($\theta$ sec.) wherein the film interior reaches the equilibrium may be represented by an equation of $\theta = d^2/6 \cdot D$, wherein d denotes the film thickness ($\mu$m) of the film, and D denotes a diffusion constant (($\mu$m)$^2$/sec). Accordingly, the period of time for the measurement is different depending on the kind of the sample.

<Thickness measurement>

A thickness of not less than 0.5 $\mu$m was measured by means of a commercially available digital-type thickness measuring device (contact-type thickness measuring device, trade name: Ultra-High Precision Deci-Micro Head MH-15M, mfd. by Nihon Kogaku K.K.).

On the other hand, a thickness of less than 0.5 $\mu$m was determined by a gravimetric analysis method, wherein the weight of a film having a predetermined area was measured, the resultant weight was divided by the area, and further divided by the specific gravity of the composition, or an elemental analysis method (in the case of a laminate comprising a resin composition and a base material, etc.).

In a case where the elemental analysis (Measuring principle: ICP emission spectrometry, with reference to a book entitled "ICP Emission Spectrometry", edited by Nihon Bunseki Kagaku-kai (Japan Society of Analytical Chemistry), 1988, published by Kyoritsu Shuppan) was used, the ratio between the layer of the resin composition according to the present invention and the base material was determined by calculation on the basis of the ratio between the analytical value of a predetermined inorganic element (originating from the composition) of the laminate, and the fraction of a predetermined element (e.g., Si) of the layer of the inorganic laminar compound alone.

<Particle size measurement>

Predetermined parameters such as the refractive index of a solvent (e.g., n=1.332 in the case of water), the viscosity of the solvent (e.g., $\eta$=0.890 cP. in the case of water), and the refractive index of an inorganic laminar compound (e.g., n=1.56 in the case of mica) were inputted to a commercially available ultrafine particle size analyzing apparatus (trade name: BI-90, mfd. by Brookheven Co., U.S.A., Japanese agent: Nikkiso K.K.), and measurement was conducted at a temperature of 25° C., in a solvent of water, while a solution having a weight ratio (inorganic laminar compound/water) of 2% was diluted in accordance with an estimated particle size. Through such a method, the particle size L was determined as a central particle size value measured by photon correlation method based on dynamic light scattering, which was automatically output from the above analyzer as a digital value. In this particle size measurement for the inorganic laminar compound, each time the measurement was conducted, calibration measurement was also conducted by using the following standard samples comprising true spherical fine particles, whereby it was confirmed that the measured data of the particle size of the standard samples fell within the range of relative error of ±10%.

True Spherical Fine Particles: particles mfd. by Dow Chemical Co., U.S.A., trade name: UNIFORM LATEX PARTICLES <Particle size determined by SEM (scanning electron microscope); Dow>

0.085 $\mu$m (deviation 0.0055 $\mu$m)
0.109 $\mu$m (deviation 0.0027 $\mu$m)
0.330 $\mu$m (deviation 0.0040 $\mu$m)
0.806 $\mu$m (deviation 0.0057 $\mu$m)
2.02 $\mu$m (deviation 0.0135 $\mu$m)
2.97 $\mu$m (deviation 0.23 $\mu$m)

<Aspect ratio calculation>

An inorganic laminar compound and a resin composition were respectively subjected to diffraction measurement by means of a commercially available X-ray diffractometer (trade name: XD-5A, mfd. by Shimazu Seisakusho K.K.) through a powder method. The lattice spacing (unit thickness) a was determined on the basis of the measurement of the inorganic laminar compound alone. In addition, it was confirmed that a portion in which the lattice spacing of the inorganic laminar compound had been increased (a potion in which lattice spacing d>a) was present, on the basis of the diffraction measurement of the resin composition.

By use of the resultant particle size L obtained by the dynamic scattering method, the aspect ratio Z was determined by using an equation of Z=L/a.

EXAMPLE 1

Natural montmorillonite (trade name: Kunipia F, mfd. by Kunimine Kogyo K.K.) was dispersed in ion-exchange water (electric conductivity: 0.7 $\mu$S/cm or below) so as to provide a concentration of 2 wt. %, thereby to provide a dispersion of an inorganic laminar compound (Liquid A). The above montmorillonite had a particle size of 560 nm, a unit thickness a obtained by powder X-ray diffraction of 1.2156 nm, and an aspect ratio of 461.

Separately, a polyvinyl alcohol (trade name: PVA 117H, mfd. by Kuraray K.K., saponification degree=99.6%, degree of polymerization=1700) was dissolved in ion-exchange water (electric conductivity: 0.7 μS/cm or below) so as to provide a concentration of 2 wt. %, thereby to provide a resin solution (Liquid B).

The thus obtained Liquids A and B were mixed with each other so as to provide a solid content ratio (volume ratio) of (inorganic laminar compound/resin) =3/7, thereby to provide a coating liquid.

The coating liquid having the above composition was applied onto the vapor-deposited silicon oxide surface of a 12 μm-thick polyethylene terephthalate film having a silicon oxide vapor deposition coating (trade name: MOS, mfd. by Oike Kogyo Co.) by gravure coating (by use of "Test Coater" mfd. by Yasui Seiki K.K., microgravure coating method, coating speed: 3 m/min., drying temperature: 80° C. (inlet side heater), 100° C. (outlet side heater)), thereby to provide a laminate film. The thickness after drying of the above coating layer was 0.3 μm.

The thus obtained laminate film was subjected to oxygen permeability measurement at 30° C., 60% RH. As a result, the measured oxygen permeability was below 0.1 cc/m$^2$·day·atm as shown in Table 1, and it was found that the laminate film was excellent in gas barrier property.

EXAMPLES 2–6

Laminate films were prepared and the oxygen permeabilities thereof were measured in the same manner as in Example 1, except that the kind of the inorganic laminar compound and/or resin, volume ratio between the inorganic laminar compound and resin, crosslinking agent for a hydrogen-bonding group, and the conditions for a heat treatment after the film formation were respectively changed to those shown in Table 1.

The measurement results are shown in the above Table 1. As shown in the Table 1, all of the laminate films provided by these Examples had an excellent barrier property.

EXAMPLE 7

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising the Liquid A and Liquid B prepared in Example 1 in an amount so as to provide a ratio of the zirconium element of one mole, with respect to 15 mole of the hydroxyl group of the polyvinyl alcohol. By use of the resultant mixture, a laminate film was prepared and the oxygen permeability thereof was measured in the same manner as in Example 1, except that the other constituents were changed to those as shown in Table 1.

The measurement results are shown in the above Table 1. As shown in the Table 1, the laminate film provided by this Example had an excellent barrier property.

EXAMPLE 8

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising Liquid A and Liquid B prepared in Example 1 in an amount so as to provide a ratio of the zirconium element of one mole with respect to 15 mole of the hydroxyl group the Polyvinyl alcohol. By use of the resultant mixture, a laminate film was prepared in the same manner as in Example 1, except that the other constituents were changed to those as shown in Table 1. Thereafter, the resultant laminate film was subjected to a heat treatment by means of a hot-air dryer at 140° C. for 10 min., thereby to provide a laminate film.

The oxygen permeability of the thus obtained was measured. As shown in the above Table 1, the laminate film provided by this Example had an excellent barrier property.

EXAMPLE 9

A 33 cm-wide non-oriented polypropylene film (trade name: Pyren Film-CT, mfd. by Toyobo K.K., thickness 60 μm) was dry-laminated onto an inorganic laminar compound-containing layer (resin composition layer) side of the laminate film obtained in Example 1, by means of a laminating machine (trade name: Test-Coater, mfd. by Yasui Seiki Co.) under a pressure of 4 kg/cm$^2$ at a speed of 6 m/min., while using a urethane-type adhesive (trade name: Yunoflex-J3, mfd. by Sanyo Kasei K.K.) in an amount of 3 g/m$^2$ (solid content), thereby to provide a laminate film. The oxygen permeability of the thus obtained laminate film was then measured at 30° C., 60% RH. As a result, the oxygen permeability was below 0.1 cc/m$^2$·day·atm and it was also found that the laminate film was excellent in the heat sealing property and transparency, as well as the gas barrier property.

Comparative Example 1

A laminate film was prepared in the same manner as in Example 1, except that the dispersion of the inorganic laminar compound (Liquid A) used in Example 1 was not used, and a resin solution (Liquid B) obtained by dissolving a polyvinyl alcohol (trade name: PVA 117H, mfd. by Kuraray K.K., saponification degree=99.6%, degree of polymerization=1700) in ionexchange water so as to provide a concentration of 2 wt. %, was used alone as a coating liquid.

The oxygen permeability of the thus obtained laminate film was measured. The measurement results are shown in Table 1. As shown in the Table 1, the above laminate film only had a poor gas barrier property.

Comparative Examples 2–4

The oxygen permeabilities of some commercially available metal- or oxide-vapor deposited films as shown in the above Table 1 were measured.

As shown in the Table 1, these films only had a poor gas barrier property.

Comparative Example 5

Preparation of a laminate film was attempted in the same manner as in Example 1, except that the resin solution (Liquid B) used in Example 1 was not used, and the dispersion of the inorganic laminar compound (Liquid A) used in Example 1 was used alone as a coating liquid. As a result, in this preparation procedure, the powder of the inorganic laminar compound (natural montmorillonite) was partially peeled off from the laminate film, the resultant surface the laminate film showed a noticeable whitish color (outside haze or scratches originating from the surface unevenness), and a good laminate film could not be obtained.

The meanings of the abbreviation used in the above Table 1 are as follows.

MOS: Polyethylene terephthalate film having a silicon oxide vapor deposition coating (trade name: MOS, mfd. by Oike Kogyo Co.)

VMPET: Polyethylene terephthalate film having an aluminum oxide vapor deposition coating (trade name: VMPET, mfd. by Toyo Aluminum K.K.)

AL: Polyethylene terephthalate film having an aluminum vapor deposition coating (trade name: Tetlite, mfd. by Oike Kogyo Co.)

F: Natural montmorillonite (trade name: Kunipia F, mfd. by Kunimine Kogyo Co.)

H: Polyvinyl alcohol (trade name: Poval 117H, mfd. by Kuraray K.K., degree of polymerization=1700, saponification degree=99.6%.)

Z: Aqueous solution of zirconium ammonium carbonate (trade name: Zircosol AC7, mfd. by Dai-ichi Kigenso Kogyo K.K.)

A: Heat treating of a laminate film (after drying) at 140° C., for 10 min.

EXAMPLE 10

Synthetic mica (tetrasilylic mica, trade name: NA-TS, mfd. by Topy Kogyo Co.) was dispersed in ion-exchange water (electric conductivity: 0.7 µS/cm or below) so as to provide a concentration of 0.65 wt. %, thereby to provide a dispersion of an inorganic laminar compound (Liquid A). The above synthetic mica had a particle size of 977 nm, a unit thickness a obtained by powder X-ray diffraction of 0.9557 nm, and an aspect ratio Z of 1043.

Separately, a polyvinyl alcohol (trade name: PVA 117H, mfd. by Kuraray K.K., saponification degree=99.6%, degree of polymerization=1700) was dissolved in ion-exchange water (electric conductivity: 0.7 µS/cm or below) so as to provide a concentration of 0.325 wt. %, thereby to provide a resin solution (Liquid B).

The thus obtained Liquids A and B were mixed with each other so as to provide a solid content ratio (volume ratio) of (inorganic laminar compound/resin) =3/7, thereby to provide a coating liquid.

The coating liquid having the above composition was applied onto a 15 µm-thick ethylene-vinyl alcohol copolymer film (trade name: Eval EF-F, mfd. by Kuraray K.K.) by gravure coating (by use of "Test Coater" mfd. by Yasui Seiki K.K., microgravure coating method, coating speed: 3 m/min., drying temperature: 80° C. (inlet side heater), 100° C. (outlet side heater)), thereby to provide a laminate film. The thickness after drying of the above coating layer was 0.8 µm.

The thus obtained laminate film was subjected to oxygen permeability measurement at 30° C., 60% RH. As a result, the measured oxygen permeability was 0.09 cc/m$^2$·day·atm as shown in Table 2.

EXAMPLES 11–15

Laminate films were prepared and the oxygen permeabilities thereof were measured in the same manner as in Example 10, except that the kind of the inorganic laminar compound and/or resin, volume ratio between the inorganic laminar compound and resin, crosslinking agent for a hydrogen-bonding group, and heat treatment after the film formation were respectively changed to those shown in Table 2.

The measurement results are shown in the above Table 2. As shown in the Table 2, all of the laminate films provided by these Examples had an excellent barrier property.

EXAMPLE 16

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising the Liquid A and Liquid B prepared in Example 10 in an amount so as to provide a ratio of the zirconium element of one mole, with respect to 15 mole of the hydroxyl group of the polyvinyl alcohol. By use of the resultant mixture, a laminate film was prepared and the oxygen permeability thereof was measured in the same manner as in Example 10, except that the other constituents were changed to those as shown in Table 2.

The measurement results are shown in the above Table 2. As shown in the Table 2, the laminate film provided by this Example had an excellent barrier property.

EXAMPLE 17

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising the Liquid A and Liquid B prepared in Example 10 in an amount so as to provide a ratio of the zirconium element of one mole, with respect to 15 mole of the hydroxyl group of the polyvinyl alcohol. By use of the resultant mixture, a laminate film was prepared in the same manner as in Example 10, except that the other constituents were changed to those as shown in Table 2. Thereafter, the resultant laminate film was subjected to a heat treatment by means of a hot-air dryer at 140° C. for 10 min., thereby to provide a laminate film.

The oxygen permeability of the thus obtained laminate film was measured. As shown in the Table 2, the laminate film provided by this Example had an excellent barrier property.

EXAMPLE 18

A non-oriented polypropylene film (trade name: Pyren Film-CT, mfd. by Toyobo K.K., thickness 60 µm) was dry-laminated onto an inorganic laminar compoundcontaining layer (resin composition layer) side of the laminate film obtained in Example 10 in the same manner as in Example 9, while using a urethane-type adhesive (trade name: Yunoflex-J3, mfd. by Sanyo Kasei K.K.) in an amount of 3 g/m$^2$ (solid content), thereby to provide a laminate film. The oxygen permeability of the thus obtained laminate film was then measured at 30° C., 60% RH. As a result, the oxygen permeability was below 0.1 cc/m$^2$·day·atm, and it was also found that the laminate film was excellent in the heat sealing property and transparency, as well as the gas barrier property.

Comparative Example 6

A laminate film was prepared in the same manner as in Example 10, except that the dispersion of the inorganic laminar compound (Liquid A) used in Example 10 was not used, and a resin solution (Liquid B) obtained by dissolving a polyvinyl alcohol (trade name: PVA 117H, mfd. by Kuraray K.K., saponification degree=99.6%, degree of polymerization=1700) in ion-exchange water so as to provide a concentration of 1 wt. %, was used alone as a coating liquid.

The oxygen permeability of the thus obtained laminate film was measured. The measurement results are shown in Table 2. As shown in the Table 2, the above laminate film only had a poor gas barrier property.

Comparative Example 7

A commercially available 15 μm-thick ethylene-vinyl alcohol copolymer film (trade name: Eval EF-F, mfd. by Kuraray K.K.) was subjected to a test for measuring the oxygen permeability thereof.

As shown by the measurement results in the Table 2, this film only had a poor gas barrier property.

Comparative Example 8

Preparation of a laminate film was attempted in the same manner as in Example 10, except that the resin solution (Liquid B) used in Example 1 was not used, and the dispersion of the inorganic laminar compound (Liquid A) used in Example 10 was used alone as a coating liquid. As a result, in this preparation procedure, the powder of the inorganic laminar compound (synthetic mica) was partially peeled off from the laminate film, the resultant surface the laminate film showed noticeable scratches, and a good laminate film could not be obtained.

The meanings of the abbreviation used in the above Table 2 are as follows.

EF-F: Ethylene-vinyl alcohol copolymer film (trade name: Eval EF-F, mfd. by Kuraray K.K., ethylene content= 32 mol %)

EF-E: Ethylene-vinyl alcohol copolymer film (trade name: Eval EF-E, mfd. by Kuraray K.K., ethylene content= 44 mol %)

NA: Tetrasilylic mica (trade name: NaTS, mfd. by Topy Kogyo Co.)

F: Natural montmorillonite (trade name: Kunipia F, by Kunimine Kogyo Co.)

H: Polyvinyl alcohol (trade name: Poval 117H, mfd. by Kuraray K.K., degree of polymerization=1700, saponification degree=99.6%, )

Z: Aqueous solution of zirconium ammonium carbonate (trade name: Zircosol AC7, mfd. by Dai-ichi Kigenso Kogyo K.K.)

A: Heat treating of a laminate film (after drying) at 140° C., for 10 min.

EXAMPLE 19

Natural montmorillonite (trade name: Kunipia F, mfd. by Kunimine Kogyo K.K.) was dispersed in ion-exchange water (electric conductivity: 0.7 μS/cm or below) so as to provide a concentration of 2 wt. %, thereby to provide a dispersion of an inorganic laminar compound (Liquid A). The above montmorillonite had a particle size of 560 nm, a unit thickness a obtained by powder X-ray diffraction of 1.2156 nm, and an aspect ratio of 461.

Separately, a polyvinyl alcohol (trade name: PVA 117H, mfd. by Kuraray K.K., saponification degree=99.6%, degree of polymerization=1700) was dissolved in ion-exchange water (electric conductivity: 0.7 μS/cm or below) so as to provide a concentration of 2 wt. %, thereby to provide a resin solution (Liquid B).

The thus obtained Liquids A and B were mixed with each other so as to provide a solid content ratio (volume ratio) of (inorganic laminar compound/resin)=3/7, thereby to provide a coating liquid.

The coating liquid having the above composition was applied onto a corona-treated surface of a 25 μm-thick biaxially oriented polypropylene film having a polyvinylidene chloride coating (trade name: Senesee KOP, mfd. by Daicel K.K., polyvinylidene chloride layer: about 4 μm) by gravure coating (by use of "Test Coater" mfd. by Yasui Seiki K.K., microgravure coating method, coating speed: 3 m/min., drying temperature: 80° C. (inlet side heater), 100° C. (outlet side heater)), thereby to provide a laminate film. The thickness after drying of the above coating layer was 0.5 μm.

The thus obtained laminate film was subjected to oxygen permeability measurement at 30° C., 60% RH. As a result, the measured oxygen permeability was below 0.1 cc/m²·day·atm as shown in Table 3, and it was found that the laminate film was excellent in gas barrier property.

EXAMPLES 20–24

Laminate films were prepared and the oxygen permeabilities thereof were measured in the same manner as in Example 19, except that the kind of the inorganic laminar compound and/or resin, volume ratio between the inorganic laminar compound and resin, crosslinking agent for a hydrogen-bonding group, and heat treatment after the film formation were respectively changed to those shown in Table 3.

The measurement results are shown in Table 3. As shown in the Table 3, all of the laminate films provided by these Examples had an excellent barrier property.

EXAMPLE 25

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising the Liquid A and Liquid B prepared in Example 19 in an amount so as to provide a ratio of the zirconium element of one mole, with respect to 15 mole of the hydroxyl group of the polyvinyl alcohol. By use of the resultant mixture, a laminate film was prepared and the oxygen permeability thereof was measured in the same manner as in Example 19, except that the other constituents were changed to those as shown in Table 3.

The measurement results are shown in the above Table 3. As shown in the Table 3, the laminate film provided by this Example had an excellent barrier property.

EXAMPLE 26

Zirconium ammonium carbonate (trade name: Zircosol AC7, mfd. by Dai-ichi Kigenso Kogyo K.K., an aqueous solution containing 15 wt. % of the solute (calculated in terms of zirconium oxide), as a crosslinking agent for hydrogen-bonding group was added to the mixture solution comprising the Liquid A and Liquid B prepared in Example 19 in an amount so as to provide a ratio of the zirconium element of one mole, with respect to 15 mole of the hydroxyl group of the polyvinyl alcohol. By use of the resultant mixture, a laminate film was prepared in the same manner as in Example 19, except that the other constituents were changed to those as shown in Table 3. Thereafter, the resultant laminate film was subjected to a heat treatment by means of a hot-air dryer at 140° C. for 10 min., thereby to provide a laminate film.

The oxygen permeability of the thus obtained laminate film was measured. As shown in the Table 3, the laminate film provided by this Example had an excellent barrier property.

EXAMPLE 27

A non-oriented polypropylene film (trade name: Pyren Film-CT, mfd. by Toyobo K.K., thickness 60 μm) was dry-laminated onto an inorganic laminar compoundcontaining layer (resin composition layer) side of the laminate film obtained in Example 19 in the same manner as in Example 9, while using a urethane-type adhesive (trade name: Yunoflex-J3, mfd. by Sanyo Kasei K.K.) in an amount of 3 g/m² (solid content), thereby to provide a laminate film. The oxygen permeability of the thus obtained laminate film was then measured at 30° C., 60% RH. As a result, the oxygen permeability was below 0.1 cc/m²·day·atm as shown in Table 3, and it was also found that the laminate film was excellent in the heat sealing property and transparency, as well as the gas barrier property.

Comparative Example 9

A laminate film was prepared in the same manner as in Example 19, except that the dispersion of the inorganic laminar compound (Liquid A) used in Example 19 was not used, and a resin solution (Liquid B) obtained by dissolving a polyvinyl alcohol (trade name: PVA 117H, mfd. by Kuraray K.K., saponification degree=99.6%, degree of polymerization=1700) in ion-exchange water so as to provide a concentration of 2 wt. %, was used alone as a coating liquid.

The oxygen permeability of the thus obtained laminate film was measured. The measurement results are shown in Table 3. As shown in the Table 3, the above laminate film only had a poor gas barrier property.

Comparative Example 10

The oxygen permeabilities of some commercially available metal- or oxide-vapor deposited films as shown in above Table 3 were measured.

As shown in the Table 3, these films only had a poor gas barrier property.

Comparative Example 11

Preparation of a laminate film was attempted in the same manner as in Example 19, except that the resin solution (Liquid B) used in Example 19 was not used, and the dispersion of the inorganic laminar compound (Liquid A) used in Example 19 was used alone as a coating liquid. As a result, in this preparation procedure, the powder of the inorganic laminar compound (natural montmorillonite) was partially peeled off from the laminate film, the resultant surface the laminate film showed noticeable scratches, and a good laminate film could not be obtained.

The meanings of the abbreviation used in the above Table 3.

KOP: Biaxially oriented polypropylene film having a polyvinylidene chloride coating (trade name: Senesee KOP, mfd. by Daicel K.K., polyvinylidene chloride layer : about 4 μm)

KET: Biaxially oriented polyethylene terephthalate film having a polyvinylidene chloride coating (trade name: Senesee KET, mfd. by Daicel K.K., polyvinylidene chloride layer : about 4 μm)

F: Natural montmorillonite (trade name: Kunipia F, mfd. by Kunimine Kogyo Co.)

H: Polyvinyl alcohol (trade name: Poval 117H, mfd. by Kuraray K.K., degree of polymerization=1700, saponification degree=99.6%, )

Z: Aqueous solution of zirconium ammonium carbonate (trade name: Zircosol AC7, mfd. by Dai-ichi Kigenso Kogyo K.K.)

A: Heat treating of a laminate film (after drying) at 140° C., for 10 min.

FIGS. 12–17 respectively show powder X-ray diffraction peaks of an inorganic laminar compound or resin composition each having various values of the lattice spacing d.

Figure 13:
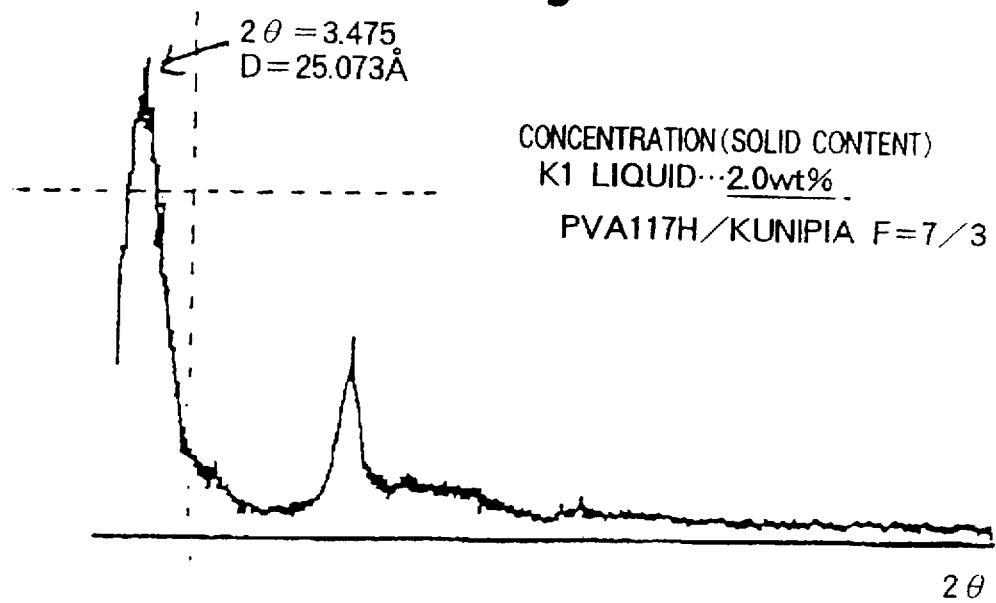
FIG. 13 is a graph showing X-ray diffraction peaks of "Kunipia F" (montmorillonite) used in Examples.
Figure 12:
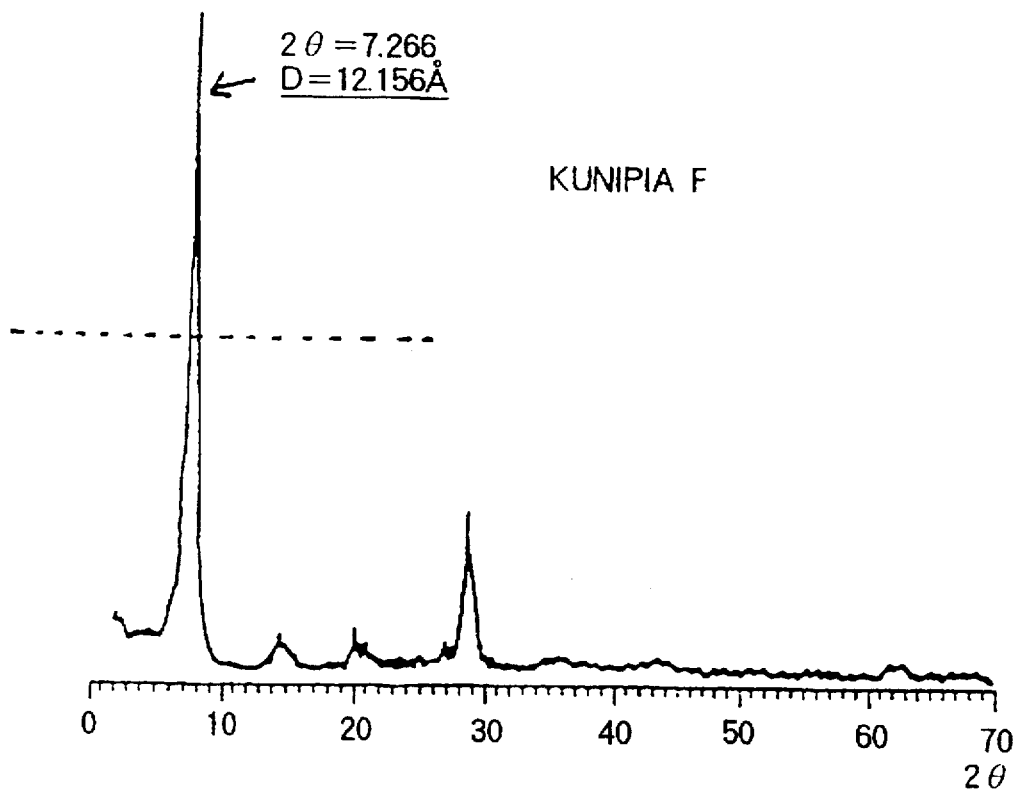
FIG. 12 is a graph showing X-ray diffraction peaks of composition comprising a polyvinyl alcohol PVA-117H and "Kunipia F" used in Examples.

FIG. 12 is a graph showing X-ray diffraction peaks of a polyvinyl alcohol PVA-117H/"Kunipia F" composition used in the above Examples. FIG. 13 is a (montmorillonite) used in Examples.

Figure 3:
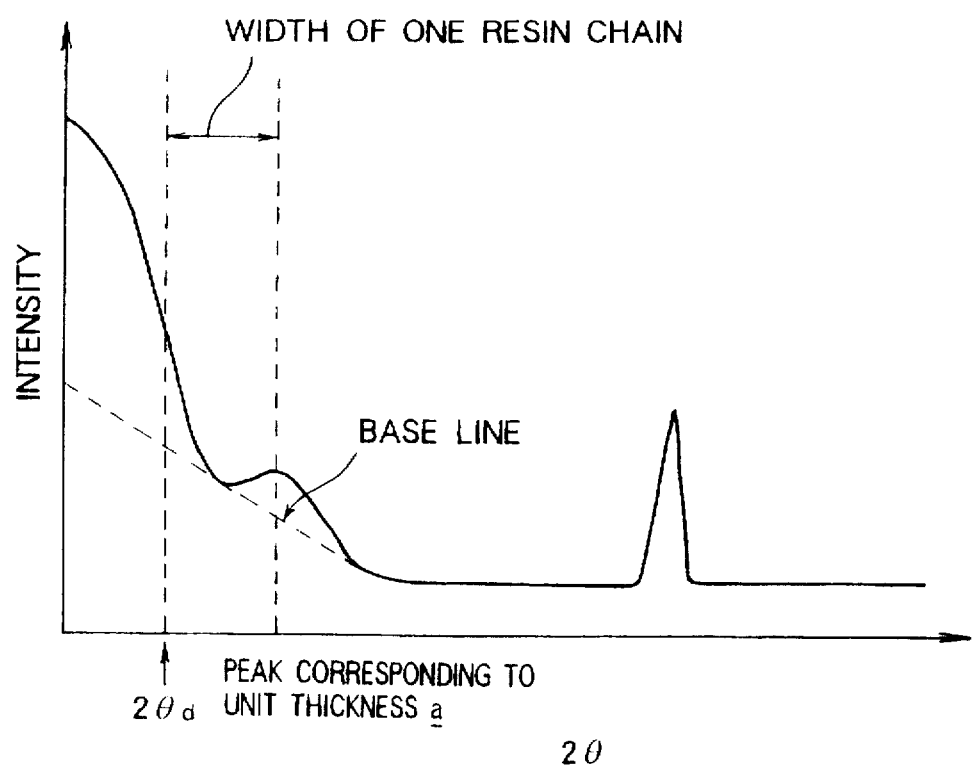
FIG. 3 is a graph schematically showing a relationship between an X-ray diffraction peak of a resin composition and a "lattice spacing d" of the composition, in a case where the peak corresponding to the lattice spacing d is superposed on halo (or background) and is difficult to be detected. In this Figure, the area obtained by subtracting a "base line" portion from the peak area in the lower angle side below $2 \cdot \theta_d$ is treated as the peak corresponding to the "lattice spacing d.

FIG. 14 (composition having a lattice spacing d=19.62 Å (pattern of the above FIG. 2), FIG. 15 (composition having a lattice spacing d=32.94 Å, pattern of the above FIG. 2 or FIG. 3), FIG. 16 (composition having a lattice spacing d≧44.13 Å (composition having a pattern of the above FIG. 3), and FIG. 17 (composition having a lattice spacing d≧44.13 Å, pattern of the above FIG. 3) are graphs respectively showing powder X-ray diffraction peaks of resin compositions having various values of the lattice spacing d.

INDUSTRIAL APPLICABILITY

As described hereinabove, according to the present invention, there is provided a laminate, laminate film or shaped article comprising: at least, a layer having a gas barrier property, and a resin composition layer containing an inorganic laminar compound having an aspect ratio of not less than 500 and not more than 5000.

According to the present invention, there is obtained a gas barrier property at a high level which has never been achieved in the prior art, on the basis of the combination of the above-mentioned resin composition layer containing the inorganic laminar compound having a specific aspect ratio, and the gas barrier substance layer.

In an embodiment of the present invention wherein an ethylene-vinyl alcohol copolymer (or polyvinylidene chloride) is used as the gas barrier substance, as shown in the "Best Mode for carrying Out the invention" and "Examples", the present invention easily provides a very low oxygen permeability which is lower than that in the prior art by one figure (digit) or two figures under a standard environment, while a layer of the ethylene-vinyl alcohol copolymer alone only shows an oxygen permeability at a level of about 1 cc/m²·day·atm (in the case of a layer predominantly comprising polyvinylidene chloride alone, at a level of about 10 cc/m²·day·atm). As a result, the present invention provides a barrier property which is much higher than the barrier property of a material of a similar kind used in the prior art.

According to the present invention, it is possible to remarkably suppress a decrease in the "barrier property at the time of folding", which has been liable to occur when a metal or oxide film is laminated on a resin composition.

The laminate, laminate film or shaped article according to the present invention may exhibits a barrier property at a level which is much higher than the barrier property of a material of a similar kind used in the prior art, and is even closer to that of metal or ceramic. On the basis of such a high barrier property, the laminate, laminate film or shaped article according to the present invention is also usable for a purpose in which a metal or inorganic material such as aluminum foil and glass is considered to be essential in the prior art, and is a material overthrowing the common knowledge on the conventional resin composition having a barrier property. Of course, in consideration of the weak points such as opaqueness of a metal and brittleness of a ceramic material, the laminate, laminate film or shaped article according to the present invention comprising a resin composition has characteristics better than those of the metal or ceramic material.

On the basis of the above-mentioned characteristics, the laminate, laminate film or shaped article according to the present invention is usable as a packaging material. In the usage in food packaging, it is usable for a wide range of packaging, such as: "miso" (soybean paste), pickles, daily dish, baby food, "tsukudani" (preserved food boiled down in soy sauce), "konnyaku" (paste made from devil's-tongue), "chikuwa" (Japanese fish paste cooked in a bamboo-like shape), "kamaboko" (boiled fish paste), processed marine products, meat ball, hamburger steak, Genghis Khan-type meat (meat for cooking), ham, sausage, and other processed stock raising products, green tea, coffee, tea, dried bonito, "tororo-konbu" (sliced tangle), oily confectionery such as French fried potatoes and buttered peanuts, confectionery made from rice, biscuit, cookie, cake, "manjuu" (bun stuffed with sweetened bean paste), sponge cake, cheese, butter, cut rice cake, soup, source, Chinese noodles, etc.

In addition, the laminate, laminate film or shaped article according to the present invention is suitably usable for a wide range purposes including industrial packaging such as: those in the fields of medical, electronics, chemical and mechanical; more specifically, packaging of feed for pets, agricultural chemicals and fertilizer, and package for transfusion; and semiconductor packaging, packaging of an oxidative agent (or an agent susceptible to oxidation), precision material packaging, etc.

Further, the laminate, laminate film or shaped article according to the present invention is suitably usable as a shaped article in the form of bottle, tray, etc., to be used for a squeezing-type bottle of mayonnaise, juice, soy sauce, edible oil, sauce, food tray for microwave oven, cups for yogurt, etc.

The laminate, laminate film or shaped article according to the present invention may exhibit a good gas barrier property in any form or shape of those as described hereinabove.

TABLE 1

| | BASE MATERIAL (THICKNESS μm) | INORGANIC SUBSTANCE-CONTAINING LAYER [VOLUME RATIO] (THICKNESS μm) | OXYGEN PERMEABILITY (30° C., 60% RH) cc/m² · d · atm |
|---|---|---|---|
| EX. 1 | MOS (12) | F/H[3/7] (0.3) | <0.1 |
| EX. 2 | VMPET (12) | F/H[3/7] (0.3) | <0.1 |
| EX. 3 | VMPET (12) | F/H[4/6] (0.3) | <0.1 |
| EX. 4 | AL (12) | F/H[2/8] (0.3) | <0.1 |
| EX. 5 | MOS (12) | F/H[1.5/8] (0.3) | <0.1 |
| EX. 6 | MOS (12) | F/H[1/8] (0.5) | <0.1 |
| EX. 7 | MOS (12) | F/H[2/8] (0.8) Z | <0.1 |
| EX. 8 | MOS (12) | F/H[1.5/8] (0.8) ZA | <0.1 |
| COMP. EX. 1 | MOS (12) | H (0.5) | 0.3 |
| COMP. EX. 2 | MOS (12) | NONE | 5.0 |
| COMP. EX. 3 | VMPET (12) | NONE | 6.2 |
| COMP. EX. 4 | AL (12) | NONE | 0.9 |

TABLE 2

| | BASE MATERIAL (THICKNESS μm) | INORGANIC SUBSTANCE-CONTAINING LAYER [VOLUME RATIO] (THICKNESS μm) | OXYGEN PERMEABILITY (30° C., 60% RH) cc/m² · d · atm |
|---|---|---|---|
| EX. 10 | EF-F (15) | NA/H[3/7] (0.8) | <0.1 |
| EX. 11 | EF-F (15) | F/H[3/7] (0.8) | <0.1 |
| EX. 12 | EF-E (15) | F/H[4/6] (0.8) | <0.1 |
| EX. 13 | EF-E (15) | F/H[2/8] (0.8) | <0.1 |
| EX. 14 | EF-F (15) | F/H[1.5/8] (0.9) | <0.1 |
| EX. 15 | EF-F (15) | F/H[1/8] (1.3) | <0.1 |
| EX. 16 | EF-F (15) | F/H[2/8] (0.8) Z | <0.1 |
| EX. 17 | EF-F (15) | F/H[1.5/8](0.8) ZA | <0.1 |
| COMP. EX. 6 | EF-F (15) | H (0.8) | 0.8 |
| COMP. EX. 7 | EF-F (15) | NONE | 1.0 |

TABLE 3

| | BASE MATERIAL (THICKNESS μm) | INORGANIC SUBSTANCE-CONTAINING LAYER [VOLUME RATIO] (THICKNESS μm) | OXYGEN PERMEABILITY (30° C., 60% RH) cc/m² · d · atm |
|---|---|---|---|
| EX. 19 | KOP (15) | F/H[3/7] (0.5) | <0.1 |
| EX. 20 | KOP (25) | F/H[3/7] (0.5) | <6.1 |
| EX. 21 | KOP (25) | F/H[4/6] (0.5) | <0.1 |
| EX. 22 | KOP (25) | F/H[2/8] (0.8) | <0.1 |
| EX. 23 | KOP (25) | F/H[1.5/8](0.8) | <0.1 |
| EX. 24 | KOP (25) | F/H[1/8] (1.5) | <0.1 |
| EX. 25 | KET (15) | F/H[2/8] (0.8) Z | <0.1 |
| EX. 26 | KET (15) | F/H[1.5/8] (0.8) ZA | <0.1 |
| COMP. EX. 9 | KOP (15) | H (0.8) | 3.0 |
| COMP. EX. 10 | KOP (15) | NONE | 8.5 |

We claim:

1. A laminate comprising:
   (a) a layer comprising a substance having a gas barrier property; and
   (b) at least one layer which is disposed on the layer (a) wherein said layer (b) comprises a resin composition comprising a resin and an inorganic laminar compound having an aspect ratio of not less than 50 and not more than 5000, said inorganic laminar compound being such that it is swollen or cleft in a solvent, said inorganic laminar compound being selected from the group consisting of a graphite, a phosphoric acid salt derivative compound, a chalcogen compound, a kaolinite series clay mineral, an antigorite series clay mineral, a smectite series clay mineral, and a mica series clay mineral, said resin comprising one selected from the group consisting of polyvinyl alcohol (PVA), ethylenevinylalcohol copolymer (EVOH), polyacrylonitrile (PAN), polysaccharide, polyacrylic acid, and esters thereof.

2. A laminate according to claim 1, wherein the layer (a) comprising the gas barrier substance is disposed on another resin layer underlying the layer (a) substance.

3. A laminate according to claim 1, wherein the gas barrier substance comprises a metal or metal oxide.

4. A laminate according to claim 1, wherein the layer comprising the gas barrier substance comprises a layer comprising an ethylene-vinyl alcohol copolymer as a main component.

5. A laminate according to claim 1, wherein the layer comprising the gas barrier substance comprises a layer comprising a polyvinylidene chloride as a main component.

6. A laminate according to claim 1, wherein the inorganic laminar compound is an inorganic laminar compound having a particle size of 5 µm or smaller.

7. A laminate according to claim 1, wherein the inorganic laminar compound comprises a clay mineral having a swelling property.

8. A laminate according to claim 1, wherein the inorganic laminar compound is an inorganic laminar compound having an aspect ratio of 200 to 3000.

9. A laminate according to claim 1, wherein the inorganic laminar compound and the resin constituting the resin composition have a volume ratio (inorganic laminar compound/resin) in the range of (5/95) to (90/10).

10. A laminate according to claim 1, wherein the resin constituting the resin composition is a highly hydrogen-bonding resin.

11. A laminate according to claim 10, wherein the highly hydrogen-bonding resin is a resin such that the wt. percent of a hydrogen-bonding group or ionic group per unit weight of the resin is not less than 30% and not more than 50%.

12. A laminate according to claim 10, wherein the highly hydrogen-bonding resin is polyvinyl alcohol or polysaccharide.

13. A laminate according to claim 10, wherein the resin composition further comprises a crosslinking agent for hydrogen-bonding group.

14. A laminate according to claim 13, wherein the crosslinking agent for hydrogen-bonding group is a zirconia compound.

15. A laminate according to claim 1, which has an oxygen permeability of not more than 0.2 cc/m$^2$·day·atm under the conditions of 30° C. and 60% RH.

16. A laminate according to claim 1, which has a shape in the form of a laminate film.

17. A laminate film, comprising: a base material, and at least one layer disposed thereon comprising a laminate according to claim 1.

18. A laminate film according to claim 17, which has an oxygen permeability of not more than 0.2 cc/m$^2$·day·atm under the conditions of 30° C. and 60% RH.

19. A shaped article, comprising a laminate according to claim 1 as at least a portion thereof.

20. A shaped article according to claim 19, which has an oxygen permeability of not more than 02 cc/m$^2$·day·atm under the conditions of 30° C. and 60% RH.

21. A laminate, comprising:
at least one layer comprising a resin selected from biaxially oriented polypropylene, biaxially oriented nylon and biaxially oriented polyethylene terephthalate; and
at least one layer comprising a laminate according to claim 1.

22. A laminate according to claim 21, which has a shape in the form of a laminate film.

23. A laminate according to claim 1, wherein the inorganic laminar compound is at least one selected from the group consisting of a graphite, a phosphoric acid salt derivative compound and a chalcogen compound.

24. A laminate according to claim 23, wherein the inorganic laminate compound is a chalcogen compound represented by the formula $MX_2$, wherein M denotes an element selected from the group consisting of Group IV, Group V and Group VI, and X is S, Se, Te.

25. A laminate according to claim 24, wherein said chalcogen compound M is at least one member selected from the group consisting of Ti, Zr, Hf, V, Mb, Ta, Mo and W.

26. A laminate according to claim 1, wherein the inorganic laminar compound is at least one selected from the group consisting of a salt, a kaolinite series clay mineral, antigorite series clay mineral, smectite series clay mineral, and mica series clay minerals, said inorganic compound being at least one of (i) a clay having a two-layer structure, which comprises a silica tetrahedral layer, and an octahedral layer disposed thereon and comprising a central metal; or a three-layer structure, which comprises an octahedral layer comprising a central metal, and a silica tetrahedral layer disposed on the both sides of the octahedral layer so as to sandwich the octahedral layer.

27. A laminate according to claim 26, wherein the clay mineral comprises at least one selected from the group consisting of: kaolinite, dickite, nacrite, halloysite, antigorite, chrysotile, pyrophyllite, montmorillonite, hectorite, tetrasilylic mica, sodium taeniolite, muscovite, margarite, talc, phlogopite, xanthophyllite, and chlorite.

* * * * *